US012641507B2

(12) United States Patent
Abtin et al.

(10) Patent No.: US 12,641,507 B2
(45) Date of Patent: May 26, 2026

(54) FIRST NODE, SECOND NODE, THIRD NODE AND METHODS PERFORMED THEREBY FOR HANDLING ROAMING INFORMATION

(71) Applicant: Telefonaktiebolaget LM Ericsson (publ), Stockholm (SE)

(72) Inventors: Afshin Abtin, Sollentuna (SE); Ralf Keller, Würselen (DE); Ann-Christine Sander, Skepplanda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 748 days.

(21) Appl. No.: 17/917,722

(22) PCT Filed: Apr. 9, 2020

(86) PCT No.: PCT/SE2020/050376
§ 371 (c)(1),
(2) Date: Oct. 7, 2022

(87) PCT Pub. No.: WO2021/206598
PCT Pub. Date: Oct. 14, 2021

(65) Prior Publication Data
US 2023/0164659 A1 May 25, 2023

(51) Int. Cl.
*H04W 36/32* (2009.01)
*H04W 36/00* (2009.01)
*H04W 36/08* (2009.01)

(52) U.S. Cl.
CPC ........... *H04W 36/32* (2013.01); *H04W 36/08* (2013.01); *H04W 36/0022* (2013.01)

(58) Field of Classification Search
CPC ..... H04W 76/50; H04W 76/18; H04W 60/00; H04W 48/20; H04W 60/04; H04L 65/1073; H04L 65/1016
See application file for complete search history.

(56) References Cited

U.S. PATENT DOCUMENTS

2017/0311151 A1    10/2017  Ohashi et al.
2019/0335534 A1*  10/2019  Atarius ............... H04L 65/1016
(Continued)

FOREIGN PATENT DOCUMENTS

WO        2019076439 A1    4/2019

OTHER PUBLICATIONS

International Search Report and Written Opinion dated Dec. 18, 2020 for International Application No. PCT/SE2020/050376 filed Apr. 9, 2020; consisting of 11 pages.
(Continued)

*Primary Examiner* — Iqbal Zaidi
(74) *Attorney, Agent, or Firm* — Weisberg I.P. Law, P.A.

(57)            ABSTRACT

A method, performed by a first node, for handling roaming information. The first node operates in a first communications network. The first node determines a mobility procedure to be used for a device from a second communications network while roaming into the first communications network. The mobility procedure is related to at least one of: a) an Evolved Packet System (EPS) fallback procedure for a non-emergency service, and b) an Emergency Service fallback to EPS procedure. Determining the mobility procedure is based on a preference of the second communications network. The first node then initiates providing an indication of the determined mobility procedure to a second node, which receives the indication and enables usage of the indicated mobility procedure. A third node sends a first indication to the first node indicating the preference.

18 Claims, 14 Drawing Sheets

(56) References Cited

U.S. PATENT DOCUMENTS

2020/0359439 A1* 11/2020 Qiao .................. H04W 40/246
2021/0153087 A1* 5/2021 Lee ...................... H04W 36/08

OTHER PUBLICATIONS

3GPP TS 22.261 V17.0.0; 3rd Generation Partnership Project; Technical Specification Group Services and System Aspects; Service requirements for the 5G system; Stage 1 (Release 17); Sep. 2019; consisting of 83 pages.
3GPP TS 23.501 V16.2.0; 3rd Generation Partnership Project; Technical Specification Group Services and System Aspects; System Architecture for the 5G System (5GS); Stage 2 (Release 16); Sep. 2019; consisting of 391 bages.
3GPP TS 23.502 V15.4.1; 3rd Generation Partnership Project; Technical Specification Group Services and System Aspects; Procedures for the 5G System; Stage 2 (Release 15); Jan. 2019; consisting of 347 pages.
3GPP TS 23.502 V16.3.0; 3rd Generation Partnership Project; Technical Specification Group Services and System Aspects; Procedures for the 5G System (5GS); Stage 2 (Release 16); Dec. 2019; consisting of 558 pages.

* cited by examiner

Start

501. Receive the indication

502. Enable usage of the mobility procedure

End a)

a)

b)

FIRST NODE, SECOND NODE, THIRD NODE AND METHODS PERFORMED THEREBY FOR HANDLING ROAMING INFORMATION

CROSS-REFERENCE TO RELATED APPLICATION

This application is a Submission Under 35 U.S.C. § 371 for U.S. National Stage Patent Application of International Application Number: PCT/SE2020/050376, filed Apr. 9, 2020 entitled "FIRST NODE, SECOND NODE, THIRD NODE AND METHODS PERFORMED THEREBY FOR HANDLING ROAMING INFORMATION," the entirety of which is incorporated herein by reference.

TECHNICAL FIELD

The present disclosure relates generally to a first node and methods performed thereby for handling roaming information. The present disclosure also relates generally to a second node, and methods performed thereby for handling roaming information. The present disclosure further relates generally to a third node and methods performed thereby for handling roaming information.

BACKGROUND

Nodes within a telecommunications network may be wireless devices, e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the telecommunications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The telecommunications network may cover a geographical area which may be divided into cell areas, each cell area being served by another type of node, a network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The telecommunications network may also be a non-cellular system, comprising network nodes which may serve receiving nodes, such as wireless devices, with serving beams.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with UEs. In a forum known as the Third Generation Partnership Project (3GPP), telecommunications suppliers propose and agree upon standards for present and future generation networks and UTRAN specifically, and investigate enhanced data rate and radio capacity. In some RANs, e.g., as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3rd Generation Partnership Project (3GPP) and this work continues in the coming 3GPP releases, such as Fifth Generation (5G) networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio NR, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

5G is the fifth generation of cellular technology and was introduced in Release 15 of the 3GPP standard. It is designed to increase speed, reduce latency, and improve flexibility of wireless services. The 5G system (5GS) includes both a new radio access network (NG-RAN) and a new core network (5GC).

5G is designed to support new use case requiring ultra-reliable low-latency communication (URLLC) such as factory automation and autonomous driving. To be able to meet the stringent requirements on reliability and latency also during mobility, two new handover types are introduced in 5G Release 16 called make-before-break handover and conditional handover. These will be described in more detail below after a review of the NG-RAN architecture and the legacy handover procedure.

Overview of the NG-RAN Architecture.

Similar to E-UTRAN in 4G, the NG-RAN uses a flat architecture and consists of base stations, called gNBs, which are interconnected with each other by means of the Xn-interface. The gNBs are also connected by means of the NG interface to the 5GC, more specifically to the Access and Mobility Function (AMF) by the NG-C interface and to the User Plane Function (UPF) by means of the NG-U interface. The gNB in turn supports one or more cells which provides the radio access to the UE. The radio access technology, called New Radio (NR) is Orthogonal Frequency Division Multiplexing (OFDM) based like in LTE and offers high data transfer speeds and low latency. Note that NR is sometimes used to refer to the whole 5G system although it is strictly speaking only the 5G radio access technology.

It is expected that NR will be rolled out gradually on top of the legacy LTE network starting in areas where high data traffic is expected. This means that NR coverage will be limited in the beginning and users must move between NR and LTE as they go in and out of coverage. To support fast mobility between NR and LTE and avoid change of core network, LTE eNBs will also connect to the 5G-CN and support the Xn interface. An eNB connected to 5GC is called a next generation eNB (ng-eNB) and is considered part of the NG-RAN.

The 5G core (5GC) and NR are specified in 3GPP TS 23.501 and 23.502. Additionally, Internet Protocol (IP) Multimedia Subsystem (IMS) based emergency service and normal voice service may be provided using Emergency Service fallback 3GPP TS 23.502, § 4.13.4.2 or EPS fallback procedures as specified in 23.502, § 4.13.6.1, where the UE may be moved from 5GS to EPS to get a required service, e.g., an IMS Emergency call or IMS voice. This may be understood to be to enable emergency and voice service for 5GS UEs, even though the conditions for Voice/Emergency calls over NR may not be in place yet due to lack of UE and/or network capabilities. FIG. 1 is a schematic signalling diagram illustrating an example of the call flow for Emergency Service fallback. In step 1, a UE is camping on a E-UTRA or NR cell in the 5GS. In step 2, a user of the UE has a pending IMS emergency session request, e.g., voice, and, if the AMF has indicated support for emergency services using fallback, the UE sends a service request to the AMF in step 3, indicating that it requires emergency services fallback. In step 4, the AMF sends an N2 request for Emergency fallback to the NG-RNA node. One of the procedures in steps 5a or 5b may then be executed. In step 5a, an inter-Radio Access Technology (RAT) handover or Radio Resource Control (RRC) redirection procedure is initiated to a 5GC-connected E-UTRAN cell, if the UE is currently camped on NR. In step 5b, the NG-RAN initiates handover or redirection to E-UTRAN connected to EPS. NG-RAN uses the security context provided by the AMF to secure the redirection procedure. In step 6, after handover or redirection to the target cell the UE establishes a PDU Session/Packet Data Network (PDN) connection for IMS emergency services and performs the IMS procedures for establishment of an IMS emergency session, e.g., voice. Emergency service fallback additionally may also be triggered based on a Quality of Service (QoS) resource reservation as for normal voice calls per the procedures illustrated in the signalling diagram of FIG. 2. In step 1, a UE is camping on NG-RAN in the 5GS and a Mobile-Originated (MO) or Mobile-Terminated (MT) IMS voice session establishment has been initiated. In step 2, a Network (NW) initiated Protocol Data Unit (PDU) Session modification to setup QoS flow for voice reaches the NG-RAN. In step 3, NG-RAN is configured to support EPS fallback for IMS voice and decides to trigger fallback to EPS. NG-RAN is configured to support EPS fallback for IMS voice and decides to trigger fallback to EPS. In step 4, the NG-RAN rejects the PDU session modification, indicating that mobility due to fallback for IMS voice is ongoing. During the fallback procedure to EPS for normal and Emergency calls, the NG-RAN initiates either the Inter system Handover method or the Redirect method, as indicated in step 5. When the UE is connected to EPS, either step 6a or step 6b is executed. In step 6a, in the case of 5GS to EPS handover, and in the case of inter-system redirection to EPS with N26 interface, a Tracking Area Update (TAU) procedure is initiated by the UE. In step 6b, in the case of inter-system redirection to EPS without N26 interface, the UE initiates Attach with PDN connectivity request with request type "handover". In inter-system redirection, the UE uses the emergency indication in the RRC message and E-UTRAN provides the emergency indication to MME during Tracking Area Update or Attach procedure. In step 7, after completion of the mobility procedure to EPS or as part of the 5GS to EPS handover procedure, the Session Management Function (SMF)/Packet Gateway (PGW) re-initiates the setup of the dedicated bearer for IMS voice, mapping the 5G QoS to EPC QoS parameters. At 8, the IMS Voice session establishment is continued.

During the fallback procedure to EPS for normal and Emergency calls, two mobility models are specified, namely, the Inter system Handover method or the Redirect method. These are referred to in both of the FIG. 1 and FIG. 2 call flows, in steps 5b and step 5 respectively.

When 5GC roaming for home routed traffic is introduced, there will be interaction between Home Public Land Mobile Network (HPLMN) and Visited Public Land Mobile Network (VPLMN) during the mentioned procedures, where the NG-RAN may need to decide on which mobility method to be used in these procedures. In making this decision, existing mobility methods may cause interoperability problems between an HPLMN and a VPLMN, which may lead to emergency call failure.

SUMMARY

It is an object of embodiments herein to improve the handling of roaming information in a communications network.

According to a first aspect of embodiments herein, the object is achieved by a method, performed by a first node. The method is for handling roaming information. The first node operates in a first communications network. The first node determines a mobility procedure to be used for a device from a second communications network while roaming into the first communications network. The mobility procedure is related to at least one of: a) an Evolved Packet System (EPS) fallback procedure for a non-emergency service, and b) an Emergency Service fallback to EPS procedure. Determining the mobility procedure is based on a preference of the second communications network. The first node also initiates providing an indication of the determined mobility procedure to a second node operating in the first communications network.

According to a second aspect of embodiments herein, the object is achieved by a method, performed by the second node. The method is for handling roaming information. The second node operates in the first communications network. The second node receives the indication from the first node operating in the first communications network. The indication indicates the mobility procedure to be used for the device from the second communications network while roaming into the first communications network. The mobility procedure is related to at least one of: a) the EPS fallback procedure for a non-emergency service, and b) the Emergency Service fallback to EPS procedure. Determining the mobility procedure is based on the preference of the second communications network. The second node then enables usage of the indicated mobility procedure for the device.

According to a third aspect of embodiments herein, the object is achieved by a method, performed by a third node. The method is for handling roaming information. The third node operates in the second communications network. The third node sends a first indication to the first node operating in a first communications network. The first indication indicates the preference of the second communications network for the mobility procedure to be used for the device from the second communications network while roaming into the first communications network. The mobility procedure is related to at least one of: a) the EPS fallback procedure for a non-emergency service, and b) the Emergency Service fallback to EPS procedure.

According to a fourth aspect of embodiments herein, the object is achieved by the first node. The first node is for handling roaming information. The first node 111 is configured to operate in the first communications network. The first node is further configured to determine the mobility procedure to be used for the device from the second communications network while roaming into the first communications network The mobility procedure is configured to be related to at least one of: a) is EPS fallback procedure for a non-emergency service, and b) the Emergency Service fallback to EPS procedure. To determine the mobility procedure is configured to be based on a preference of the second communications network. The first node is also configured to initiate providing the indication of the mobility procedure configured to be determined, to the second node configured to operate in the first communications network.

According to a fifth aspect of embodiments herein, the object is achieved by the second node. The second node is for handling roaming information. The second node is configured to operate in the first communications network. The second node is further configured to receive an indication from a first node configured to operate in the first communications network. The indication is further configured to indicate the mobility procedure to be used for the device from the second communications network while roaming into the first communications network. The mobility procedure is configured to be related to at least one of: a) the EPS fallback procedure for a non-emergency service, and b) the Emergency Service fallback to EPS procedure. To determine the mobility procedure is configured to be based on the preference of the second communications network. The second node is also configured to enable usage of the mobility procedure configured to be indicated, for the device.

According to a sixth aspect of embodiments herein, the object is achieved by the third node. The third node is for handling roaming information. The third node is configured to operate in the second communications network. The third node is further configured to send the first indication to the first node configured to operate in the first communications network. The first indication is configured to indicate the preference of the second communications network for the mobility procedure to be used for the device from the second communications network while roaming into the first communications network. The mobility procedure is configured to be related to at least one of: a) the EPS fallback procedure for a non-emergency service, and b) the Emergency Service fallback to EPS procedure.

By the first node determining the mobility procedure to be used for the device while roaming in the first communications network, it is then enabled to initiate providing the indication of the determined mobility to the second node. The first node may thereby ensure that the second node enables usage of the indicated mobility procedure for the device accordingly. By the third node sending the first indication to the first node, the first node is enabled to determine the mobility procedure to be used for the device, according to the preference of the second communications network, from which the device is coming. The first node may therefore ensure that interoperability problems between the first communications network and the second communications network, e.g., the VPLMN and the HPLMN, respectively, of the device, are averted in the handling of emergency services. This may particularly make it possible for the first communications network and the second communications network to update or change the method they may support without causing interoperability problems when the device roams in the first communications network, thereby avoiding that emergency calls and voice call fail due to mismatching capabilities between the first communications network and the second communications network. Therefore, the performance of the first communications network and the second communications network is improved.

BRIEF DESCRIPTION OF THE DRAWINGS

Examples of embodiments herein are described in more detail with reference to the accompanying drawings, according to the following description.

DETAILED DESCRIPTION

Figure 1:
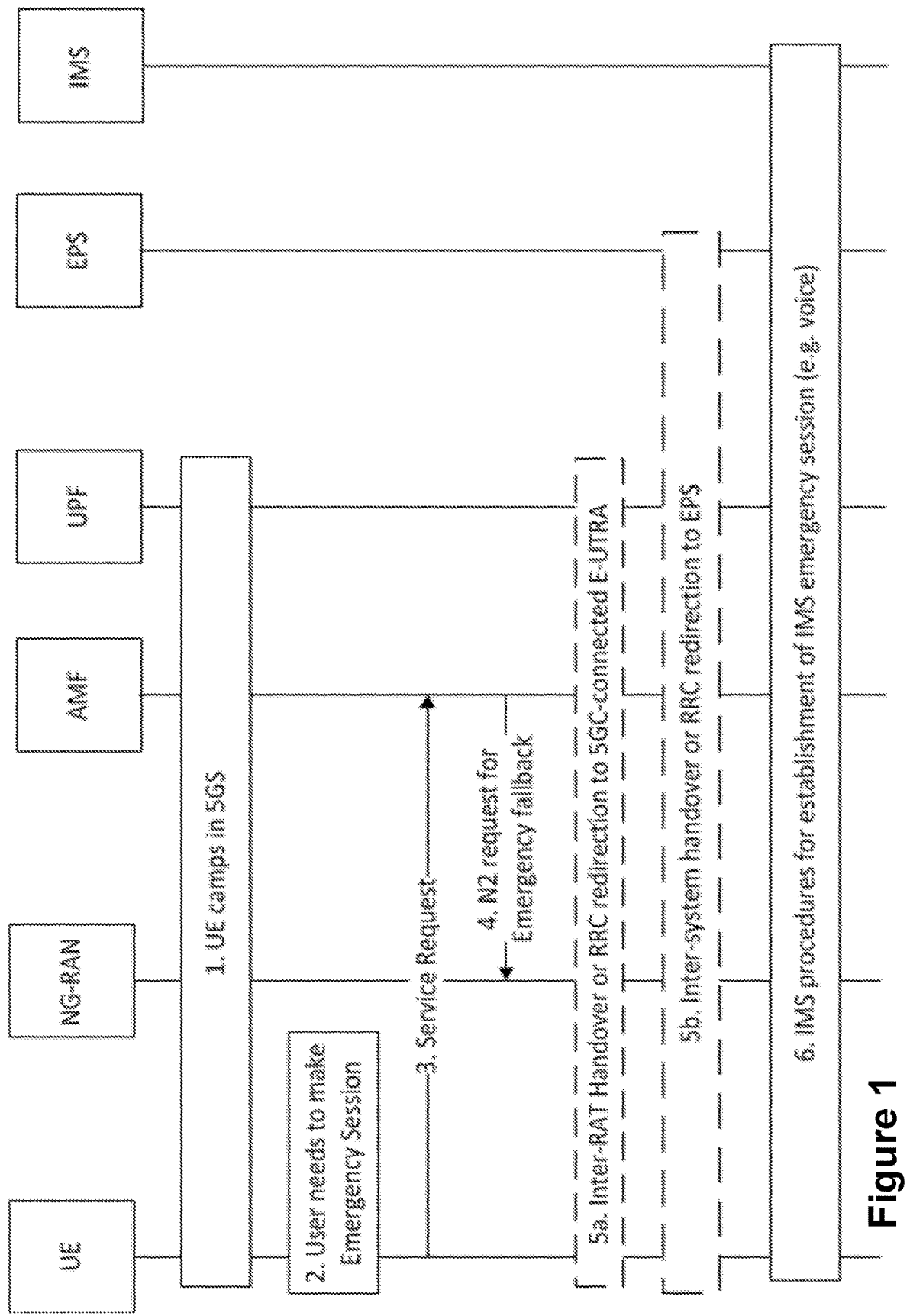
FIG. 1 is a schematic signalling diagram illustrating the call flow for Emergency Services fallback, according to existing methods.

As part of the development of embodiments herein, a problem with exiting methods will first be identified and discussed.

As there are two mobility methods for EPS fallback and for Emergency service fallback, that is, redirect or Inter system handover, and both of these are currently specified to be based on RAN selecting the applicable method, these mobility procedures may be understood to require support both in VPLMN but also in HPLMN. 5GC roaming may be understood to not be possible unless the HPLMN has introduced both methods, and the operators may need to ensure on a bilateral level, e.g., in the roaming agreement, that the support in VPLMN and HPLMN is matching. This may be understood to be difficult since, as soon as the VPLMN introduces a new mobility method this may create interoperability problems. Since, in addition, there may be numerous VPLMNs as well as HPLMNs, it will soon become complex to try to manage a coordinated support if one operator wants to upgrade and/or change supported methods. This may also result in emergency call failure, which is not acceptable. There are currently no specified solutions to indicate to a VPLMN NG-RAN, neither from the HPLMN or the VPLMN, which mobility method may be preferable, e.g., if the HPLMN does not yet support Inter system handover and hence it may be preferred to only use the redirect model.

It is assumed that the redirect method is the first to be supported for non-roaming, and the Inter system handover may be supported later for a certain operator. Since the decision is to be taken by the RAN, it will probably be the case that if both methods are supported, the RAN will select the Inter system handover in most cases. But since different operators may launch roaming in different timeframes, it is difficult to predict that all operators will have redirect only, or that all operators will in addition support the Inter system handover. It may also be the case that certain operators only support Inter system handover.

Several embodiments are comprised herein, which address these problems of the existing methods. Embodiments herein may be understood to be related to 5GS roaming and a preferred mobility procedure indication for EPS fallback. Particular embodiments herein may provide for methods that may enable a node, such as an AMF, in one network, e.g., a VPLMN, to obtain information about the preferences on mobility procedures of another network, e.g., a HPLMN. The node, e.g., the AMF, in the VPLMN may then be enabled to provide the information about the preferences on the mobility procedure to the RAN of the same network. Interoperability problems between the two networks, e.g., HPLMN and VPLMN, may therefore be averted in the handling of emergency services.

The embodiments will now be described more fully hereinafter with reference to the accompanying drawings, in which examples are shown. In this section, embodiments herein are illustrated by exemplary embodiments. It should be noted that these embodiments are not mutually exclusive. All possible combinations are not described to simplify the description. Components from one embodiment or example may be tacitly assumed to be present in another embodiment or example and it will be obvious to a person skilled in the art how those components may be used in the other exemplary embodiments.

Figure 3:
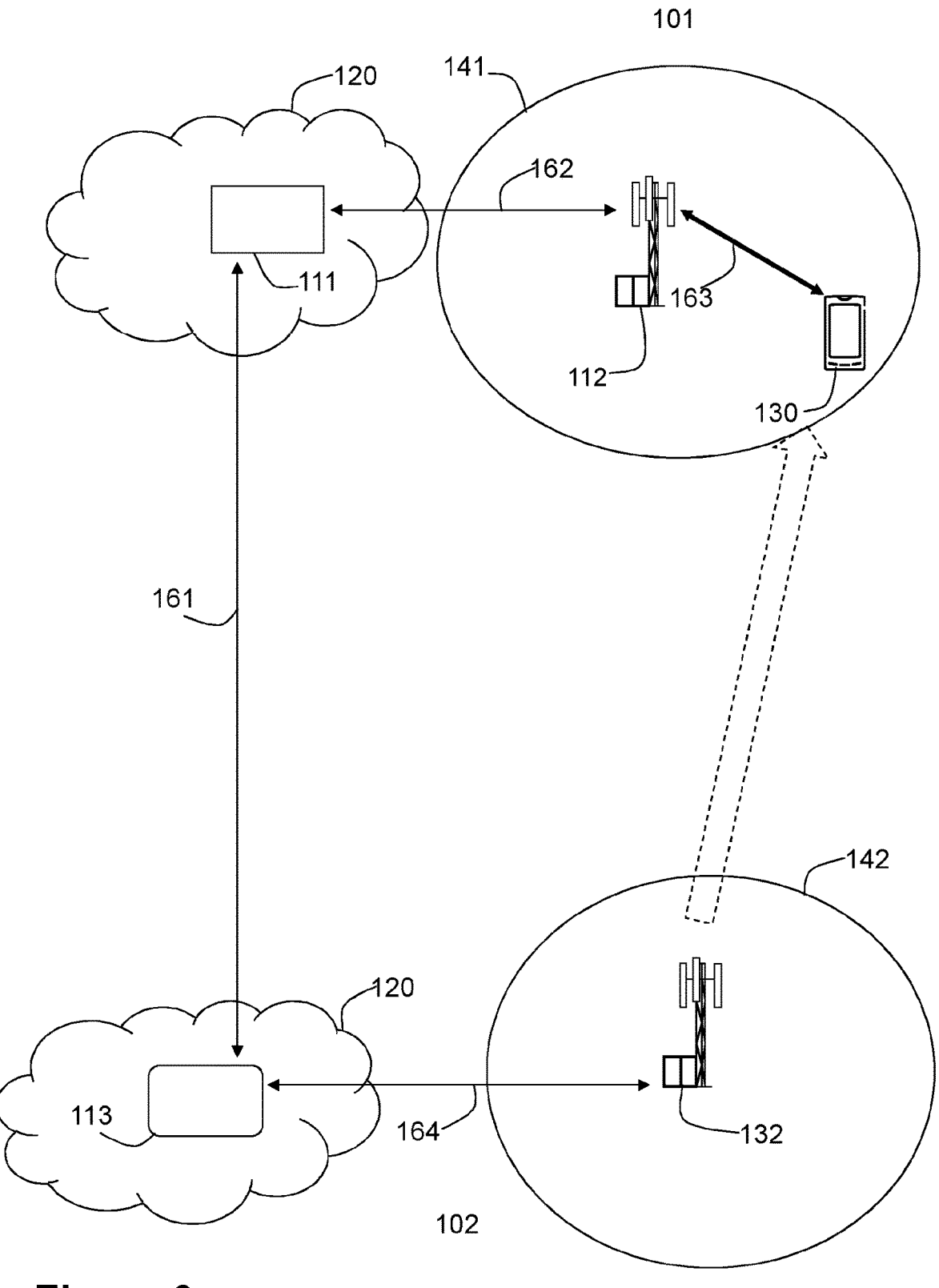
FIG. 3 is a schematic diagram illustrating a non-limiting example of a first communications network and a second communications network, according to embodiments herein.

FIG. 3 depicts a non-limiting example of a system of communications networks, in which embodiments herein may be implemented. The system of communications networks comprises a first communications network 101 and a second communications network 102. Any of the first communications network 101 and the second communications network 102 may be sometimes also referred to as a wireless communications network, cellular radio system, cellular network or wireless communications system. Any of the first communications network 101 and the second communications network 102 may for example be a network such as 5G system, or Next Gen network, or a newer system supporting similar functionality. Any of the first communications network 101 and the second communications network 102 may additionally support EPS, or a technology with similar functionality. In some examples, any of the first communications network 101 and the second communications network 102 may further support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as 6LowPAN, Bluetooth, or any cellular network or system.

Although terminology from Long Term Evolution (LTE) and 5G has been used in this disclosure to exemplify the embodiments herein, this should not be seen as limiting the scope of the embodiments herein to only the aforementioned system. Other wireless systems, support similar or equivalent functionality may also benefit from exploiting the ideas covered within this disclosure. In future radio access, e.g., in the sixth generation (6G), the terms used herein may need to be reinterpreted in view of possible terminology changes in future radio access technologies.

In the context of this disclosure, the first communications network 101 may be understood to be a VPLMN. The second communications network 102 may be understood to be a HPLMN. Each of the first communications network 101 and the second communications network 102 may be operated by a respective operator.

The system of communications networks may comprise a plurality of nodes, whereof a first node 111, a second node 112, and a third node 113 are depicted in FIG. 3. The first node 111 and the second node 112 operate in the first communications network 101. The third node 113 operates in the second communications network 102. Any of the first node 111, the second node 112 and the third node 113 may be understood, respectively, as a first computer system, a second computer system and a third computer system. In some examples, each of the first node 111 and the third node 113 may be implemented as a standalone server in e.g., a host computer in the cloud 120. Yet in other examples, each of the first node 111 and the third node 113 may also be implemented as processing resources in a server farm. Any of the first node 111, the second node 112 and the third node 113 may in some examples be a distributed node or distributed server, with some of their respective functions being implemented locally, e.g., by a client manager, and some of its functions implemented in the cloud 120, by e.g., a server manager.

Any of the first node 111 and the third node 113, may be a core network node. The first node 111 may manage an Access Management Function (AMF), or a node with similar functionality. The third node 113 may manages one of a Unified data management (UDM), and a Session Management Function (SMF), or a node with similar functionality.

The second node 112 may manage a Next Generation Radio Access Network (NG-RAN) node, such as a radio network node. The second node 112 may typically be a base station or Transmission Point (TP), or any other network unit capable to serve a wireless device or a machine type node in the first communications network 101. The second node 112 may be e.g., 5G gNB. The second node 112 may be e.g., a Wide Area Base Station, Medium Range Base Station, Local Area Base Station and Home Base Station, based on transmission power and thereby also coverage size. The second node 112 may be e.g., a gNB, a 4G eNB, or a 5G or alternative 5G radio access technology node, e.g., fixed or WiFi.

The second node 112 may be a stationary relay node or a mobile relay node. The second node 112 may support one or several communication technologies, and its name may depend on the technology and terminology used. The second node 112 may be directly connected to one or more networks and/or one or more core networks.

The first communications network 101 may comprise other RAN nodes similar to the second node 112. Similarly, the second communications network 102 may comprise one or more respective second nodes, such as the other second node 132 depicted in FIG. 3, with an equivalent description to that of the second node 112.

Each of the first communications network 101 and the second communications network 102 covers a geographical area which may be divided into cell areas, wherein each cell area may be served by a radio network node, although, one radio network node may serve one or several cells. In the non-limiting example depicted in FIG. 3, the second node 112 serves a first cell 141, and the other second node 132 serves a second cell 142.

Any of the first communications network 101 and the second communication network may comprise one or more devices, whereof a device 130 is depicted in FIG. 3. The device 130 may be also known as e.g., a UE, mobile terminal, wireless terminal and/or mobile station, mobile telephone, cellular telephone, or laptop with wireless capability, just to mention some further examples. The device 130 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the first communications network 101. The device 130 may be wireless, i.e., it may be enabled to communicate wirelessly in the first communications network 101 or in the second communications network 102 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the first communications network 101 and the second communications network 102.

The device 130 is roaming into the first communications network 101 from the second communications network 102, as indicated by the arrow with dashed lines, The first node 111 may communicate with the third node 113 over a first link 161, e.g., a radio link or a wired link. The third node 113 may communicate with the second node 112 over a second link 162, e.g., a radio link or a wired link. The second node 112 may communicate with the device 130 over a third link 163, e.g., a radio link or a wired link. The other second node 132 may communicate with the third node 113 over a fourth link 164, e.g., a radio link or a radio link. Any of the first link 161, the second link 162, the third link 163 and the fourth link 164 may be a direct link or a comprise one or more links, e.g., via one or more other radio network nodes.

Any of the first link 161, the second link 162, and the fourth link 164, may be a direct link or it may go via one or more computer systems or one or more core networks in the first communications network 101 or the second communications network 102, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 3.

In general, the usage of "first", "second", "third", and/or "fourth" herein may be understood to be an arbitrary way to denote different elements or entities, and may be understood to not confer a cumulative or chronological character to the nouns they modify.

Figures 4, 5:
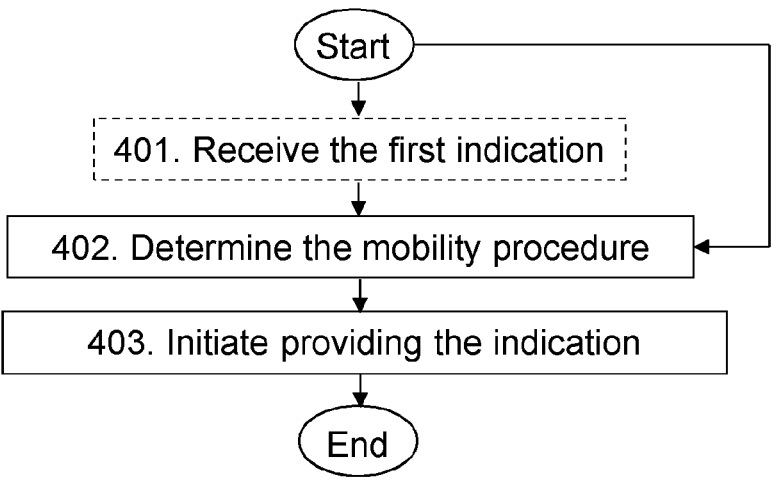
FIG. 4 is a flowchart depicting embodiments of a method in a first node, according to embodiments herein.
FIG. 5 is a flowchart depicting embodiments of a method in a second node, according to embodiments herein.

Embodiments of method performed by the first node 111, will now be described with reference to the flowchart depicted in FIG. 4. The method may be understood to be for handling roaming information. The first node 111 operates in the first communications network 101.

The method may comprise the actions described below. In some embodiments some of the actions may be performed. In some embodiments all the actions may be performed. In FIG. 4, an optional action is indicated with a dashed box. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Action 401

In this Action 401, the first node 111 may receive a first indication from the third node 113 operating in the second communications network 102. The first indication may indicate a preference of the second communications network 102. The preference is for a mobility procedure to be used for the device 130 from the second communications network 102 while roaming into the first communications network 101. The mobility procedure is related to at least one of: a) an Evolved Packet System (EPS), fallback procedure for a non-emergency service, and b) an Emergency Service fallback to EPS procedure. The mobility procedure may be one of: a redirect method and an inter system handover method.

The receiving in this Action 401 may be implemented, e.g., via the first link 161.

Figure 8:
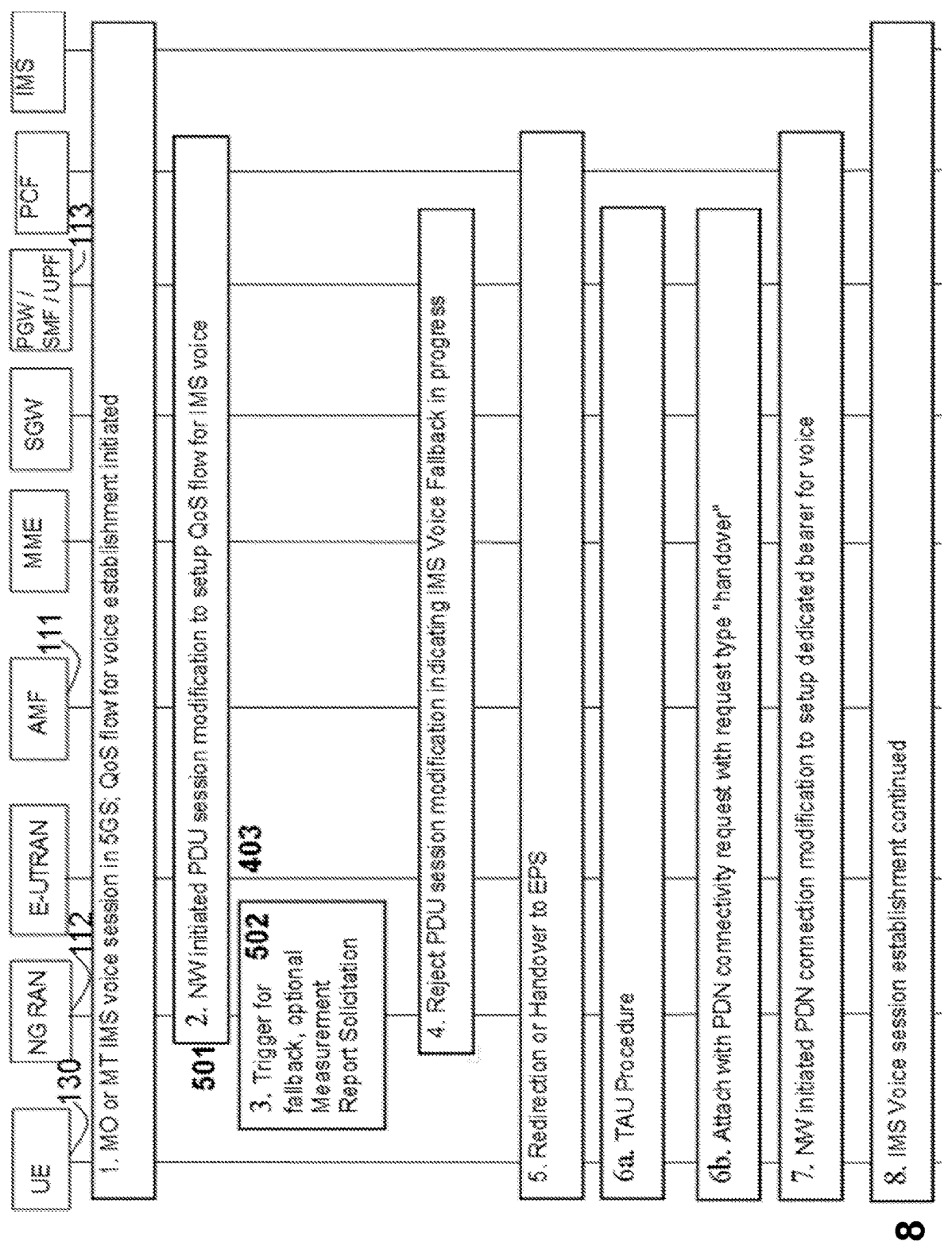
FIG. 8 is a schematic diagram depicting a non-limiting example of signalling between nodes in a first communications network and a second communications network, according to embodiments herein.

The EPS fallback procedure for a non-emergency service may be understood as the procedure described in 3GPP TS 23.502, e.g., in version 16.4.0, as "EPS fallback for IMS voice", or as a procedure with similar functionality, in for example, a different version. An example of this procedure is depicted in FIG. 8.

Figure 7:
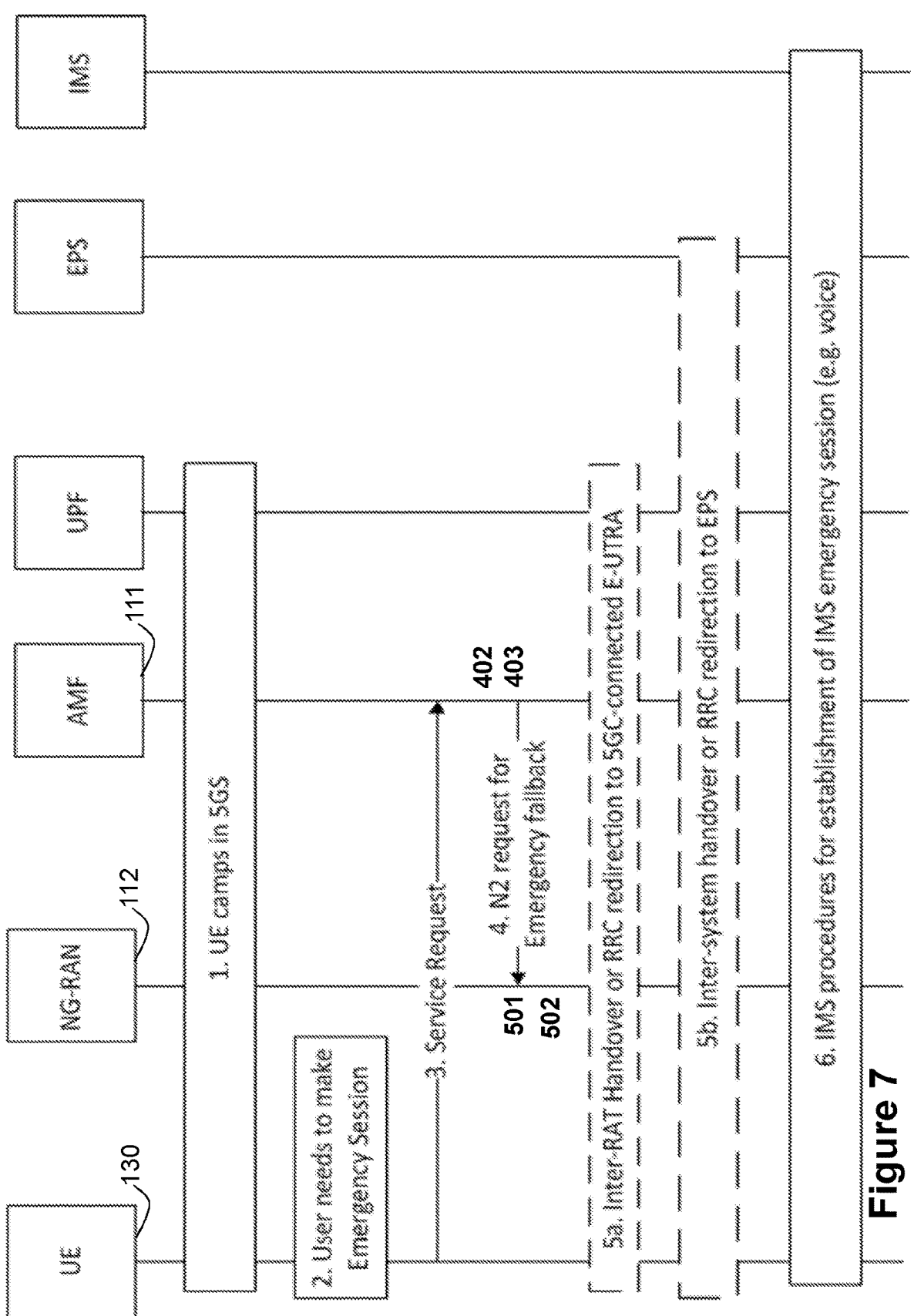
FIG. 7 is a schematic diagram depicting a non-limiting example of signalling between nodes in a first communications network, according to embodiments herein.

The Emergency Service fallback to EPS procedure may be understood as the procedure described in 3GPP TS 23.502, e.g., in version 16.4.0, as "Emergency Services Fallback", or as a procedure with similar functionality, in for example, a different version. An example of this procedure is depicted in FIG. 7. Another example may be an Emergency service fallback when a QoS based model is used to trigger it. The call flow may be based on § 4.13.6.1 in 3GPP TS 23.502, e.g., in version 16.4.0, but for emergency calls, or as a procedure with similar functionality.

The redirect method, or release and redirect method, may be understood as the procedure described in 3GPP TS 23.502, e.g., in version 16.4.0, in § 4.2.6 and § 4.11.1.3.2, or as a procedure with similar functionality, in for example, a different version.

The inter system handover method may be understood as the procedure described in 3GPP TS 23.502, e.g., in version 16.4.0, in § 4.11.1.2.1, "5GS to EPS handover", or as a procedure with similar functionality, in for example, a different version.

The first indication may indicate, for example "Release with Redirect (RwR) supported", "Intersystem HO (IRAT) and RwR supported" etc.

The first node 111 may receive the first indication during one of the following processes: a) during a registration of the device 130 with the first node 111, and b) during an interaction of the device 130 with the first communications network 101 for establishment of a PDU session for IP Multimedia Subsystem (IMS) Services.

According to the foregoing, the first node 111 may receive the first indication during registration of the device 130 with the first communications network 101. This may not be applicable to the device 130 when in limited mode. The first indication may be configured in the third node 113.

In a particular example, the first node 111 may be an AMF, and the third node 113 may be a UDM in the HPLMN. The AMF may receive the first indication from HPLMN UDM during 5GC Registration. The first indication may be configured in the UDM.

In another particular example, the first node 111 may be an AMF, and the third node 113 may be an SMF in the HPLMN. The AMF may receive the first indication from HPLMN SMF during PDU session setup. The first indication may be configured in the SMF, or provided to the SMF by a UDM and then configured into the UDM. That is, configured in HPLMN UDM, provided to the SMF and then further from SMF to VPLMN AMF.

By receiving the first indication in this Action 401, the first node 111, e.g., a VPLMN AMF, may be provided with preferences for mobility methods to be used during EPS fallback and/or Emergency Service fallback to EPS. The first node 111 may thereby be enabled to determine the mobility procedure to use for the device 130, as described next.

Action 402

In this Action 402, the first node 111, determines the mobility procedure to be used for a device 130 from the second communications network 102 while roaming into the first communications network 101. As stated earlier, the mobility procedure is related to at least one of: a) the EPS, fallback procedure for a non-emergency service, and b) the Emergency Service fallback to EPS procedure. The determining in this Action 402 of the mobility procedure is based on the preference of the second communications network 102. In particular embodiments, the determining in this Action 402 of the mobility procedure may be further based on the received first indication.

Determining may be understood as calculating, predicting, estimating, or similar. In some embodiments, the determining in this Action 402 of the mobility procedure may be further based on at least one of the following elements: a) a roaming agreement between the first communications network 101 and the second communications network 102, and b) a roaming status of the device 130.

The roaming agreement may be understood as an agreement between an operator of the first communications network 101 and an operator of the second communications network 102 enabling subscribers of the second communications network 102 to be able to roam and receive service in the first communications network 101. The first node 111 may determine the mobility procedure based on the roaming agreement, e.g., by IMSI series analysis, which may be configured in the first node 111, e.g., an AMF.

The roaming status may be understood as a model, that the first communications network 101 may provide to all inbound roamers e.g., RwR may be supported as a minimum. The first node 111 may determine the mobility procedure based on the roaming status, e.g., by using RwR for all inbound roamers, which may be configured in the first node 111, e.g., an AMF.

Action 403

Once the mobility procedure may have been determined by the first node 111 in Action 402, in this Action 403, the first node 111 initiates providing an indication of the determined mobility procedure to the second node 112 operating in the first communications network 101. The indication that the first node 111 initiates providing in this Action 403 may be considered, e.g., a second indication.

Initiating may be understood as triggering, starting, or enabling.

Providing may be understood as e.g., sending, for example, via the second link 162.

The first node 111 may manage an AMF, and the second node 112 may manage an NG-RAN. Accordingly, in particular examples of this Action 403, the AMF may provide the indication to a gNB. Based on the above, the AMF may indicate to the NG-RAN, if there are any preferences for the device 130, e.g., a particular UE/subscriber, in regard of which mobility procedure may need to be used during EPS fallback and Emergency service fallback. It may be possible to indicate the preference for only EPS fallback, or only for Emergency service fallback, or for both. These may be understood to be the redirect method and the Inter system mobility method.

The indication may be provided from the AMF to the gNB over an NG Application Protocol (NGAP) when the signaling between the device 130 and a core network node the first communications network 101, e.g., a 5GC, may be performed, and may need to be conveyed from the first node 111 to the second node 112 each time a signaling exchange may be started, since there may be no persistent storage of information concerning the device 130 in the second node 112.

With regards to when the indication may be provided, the first node 111 may provide the indication based on at least one of the following options.

In a first option, the first node 111 may provide the indication based on a service request received from the device 130. In such embodiments, the mobility procedure may be related to the Emergency Service fallback to EPS procedure. In a particular example of this option, for Emergency Services fallback, the indication indicating whether to use redirection or Inter system handover may be conveyed from the AMF in the VPLMN the to gNB when the Service Request from the device 130 reaches the AMF.

In a second option, the first node 111 may provide the indication based on a first performance of at least one of a PDU session setup and PDU session modification for voice. In other words, the first node 111 may provide the indication when the PDU Session setup/modification for voice is performed. In such embodiments, the mobility procedure may be related to the Emergency Service fallback to EPS procedure using a QoS. In a particular example of this second option, when the emergency service fallback using QoS is used, the indication may be conveyed when the PDU Session setup/modification for voice may be performed.

In a third option, the first node 111 may provide the indication based on a second performance of at least one of a PDU session setup and PDU session modification for voice. In such embodiments, the mobility procedure may be related to the fallback to EPS procedure for non-emergency service. In a particular example of this third option, when EPS Fallback for non-emergency call is used, the indication may be conveyed when the PDU Session setup/modification for voice may be performed.

There may be several combinations applicable between the three options just described with the elements on which the first node 111 may base its determination on Action 402, and the processes during which the first node 111 may receive the first indication.

In some embodiments, wherein the first node 111 may provide the indication based on at least one of: a) the service request received from the device 130 and b) the first performance, the first node 111 may provide the indication based on at least one of the following further options. According to a first further option, the first node 111 may provide the indication based on an interaction of the device 130 with the first communications network 101 for establishment of a PDU session for IP Multimedia Subsystem (IMS). Services. According to a second further option, the first node 111 may provide the indication based on a registration of the device 130 with the first node 111.

In a particular example, for Emergency Services fallback, wherein the first node 111 may be an AMF, and the second node 112 may be, e.g., a gNB, the indication indicating whether to use redirection or the Inter system handover may be conveyed from the AMF in the VPLMN, to gNB, when the Service Request from the device 130 reaches the AMF. The first node 111 may base the decision to send the indication to the second node 112, considering the roaming agreement and the roaming status of the device 130. Furthermore, the first node 111 may have received the first indication from the UDM in the HPLMN during 5GC Registration and from the SMF in the HPMN during PDU session setup.

In some particular embodiments wherein the first node 111 may provide the indication based on at least the service request received from the device 130, the first node 111 may provide the indication when providing an N2 request for Emergency call back to the second node 112. The N2 request may be based on the received request from the device 130.

In another particular example, when the emergency service fallback using QoS is used, wherein the first node 111 may be an AMF, and the second node 112 may be, e.g., a gNB, the indication indicating whether to use redirection or the Inter system handover may be conveyed from the AMF in the VPLMN, to gNB, when the PDU Session setup/modification for voice is performed. The first node 111 may base the decision to send the indication to the second node 112, considering the roaming agreement and the roaming status of the device 130. Furthermore, the first node 111 may have received the first indication from the UDM in the HPLMN during 5GC Registration and from the SMF in the HPMN during PDU session setup.

In some embodiments, such as when EPS Fallback for non-emergency call is used, wherein the first node 111 may provide the indication based on the second performance, the first node 111 may provide the indication based on at least one of the following options. According to a first option, the first node 111 may provide the indication based on a PDU session modification to setup a QoS flow for IMS voice, e.g., during QoS resource reservation. According to a second option, the first node 111 may provide the indication based on an IMS PDU session setup.

In a further particular example, when EPS Fallback for non-emergency call is used, wherein the first node 111 may be an AMF, and the second node 112 may be, e.g., a gNB, the indication indicating whether to use redirection or the Inter system handover may be conveyed from the AMF in the VPLMN, to gNB, when the PDU Session setup/modification for voice is performed. The first node 111 may base the decision to send the indication to the second node 112, considering the roaming agreement and the roaming status of the device 130. Furthermore, the first node 111 may have received the first indication from the UDM in the HPLMN during 5GC Registration and from the SMF in the HPMN during PDU session setup.

Embodiments of a method performed by the second node 112, will now be described with reference to the flowchart depicted in FIG. 5. The method is for handling roaming information. The second node 112 operating in the second communications network 102.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here to simplify the description. For example, the second node 112 may manage an NG-RAN and the first node 111 may manage an AMF.

Action 501

In this Action 501, the second node 112, receives, the indication, which may be also referred to herein as the second indication, from the first node 111 operating in the first communications network 101. The indication indicates the mobility procedure to be used for the device 130 from the second communications network 102 while roaming into the first communications network 101. The mobility procedure is related to at least one of: a) the EPS fallback procedure for the non-emergency service, and b) the Emergency Service fallback to EPS procedure. In this Action 501, determining 402 the mobility procedure is based on the preference of the second communications network 102.

The receiving may be implemented, e.g., via the second link 162.

As stated earlier, the mobility procedure may be one of: the redirect method and the inter system handover method.

The indicated mobility procedure may be further based on at least one of the following elements: a) the roaming agreement between the first communications network 101 and the second communications network 102, and b) the roaming status of the device 130.

The second node 112 may receive the indication based on at least one of the following options: a) the service request from the device 130, wherein the mobility procedure is related to the Emergency Service fallback to EPS procedure, b) the first performance of at least one of the PDU session setup and the PDU session modification for voice, wherein the mobility procedure is related to the Emergency Service fallback to EPS procedure using the QoS, and the second performance of at least one of a PDU session setup and PDU session modification for voice, wherein the mobility procedure is related to the fallback to EPS procedure for non-emergency service.

In some embodiments, the second node 112 may receive the indication based on at least one of: a) the service request from the device 130 and b) the first performance. In some of such embodiments, the second node 112 may receive the indication based on at least one of: a) the interaction of the device 130 with the first communications network 101 for establishment of the PDU session for IP IMS services, and b) the registration of the device 130 with the first node 111.

The second node 112 may receive the indication based on at least the service request from the device 130. In some of such embodiments, the second node 112 may receive the indication when receiving the N2 request for Emergency call back to the second node 112. The N2 request may be based on the request from the device 130.

The second node 112 may receive the indication based on the second performance. In some of such embodiments, the second node 112 may receive the indication based on at least one of: a) the PDU session modification to setup a QoS flow for IMS voice, and b) the IMS PDU session setup.

Action 502

After receiving the indication from the first node 111, the second node 112, in this Action 502, enables usage of the indicated mobility procedure for the device 130.

By receiving the indication, and then enabling the usage of the indicated mobility procedure for the device 130, interoperability problems between the first communications network 101 and the second communications network 102, e.g., the VPLMN and the HPLMN, respectively of the device 130, may therefore be averted in the handling of emergency services. This may particularly make it possible for the first communications network 101 and the second communications network 102 to update or change the method they may support without causing interoperability problems when the device 130 roams in the first communications network 101, thereby avoiding that emergency calls and voice call fail due to mismatching capabilities between the first communications network 101 and the second communications network 102.

Figure 6:
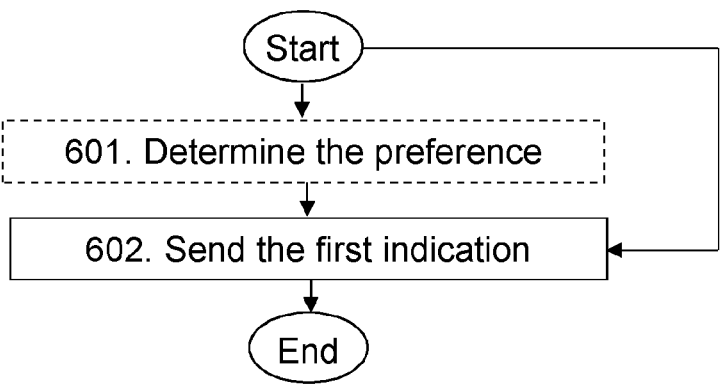
FIG. 6 is a flowchart depicting embodiments of a method in a third node, according to embodiments herein.

Embodiments of a method performed by the third node 113, will now be described with reference to the flowchart depicted in FIG. 6. The method is for handling roaming information. The third node 113 operates the second communications network 102.

The method may comprise one or both of the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 6, an optional action is represented with a box with dashed lines.

The detailed description of some of the following corresponds to the same references provided above, in relation to the actions described for the first node 111, and will thus not be repeated here to simplify the description. For example, the third node 113 may manage one of the UDM, and the SMF. The first node 111 may manage an AMF.

Action 601

In this Action 601, the third node 113 may determines the preference. The preference is of the second communications network 102 for the mobility procedure to be used for the device 130 from the second communications network 102 while roaming into the first communications network 101. The mobility procedure is related to at least one of: a) the EPS fallback procedure for a non-emergency service, and b) the Emergency Service fallback to EPS procedure.

The mobility procedure may be one of: a redirect method and an inter system handover method.

The determining of the preference in this Action 601 may be based on a level of support in the second communications network 102.

In some embodiments, the determining in this Action 601 of the mobility procedure may be further based on at least one of the following elements: a) the roaming agreement between the first communications network 101 and the second communications network 102, and b) the roaming status of the device 130.

Action 602

After determining the preference, the third node 113, in this Action 602, sends the first indication to the first node 111 operating in the first communications network 101. As stated earlier, the first indication indicates the preference of the second communications network 102 for the mobility procedure to be used for the device 130 from the second communications network 102 while roaming into the first communications network 101. The mobility procedure is related to at least one of: a) the EPS fallback procedure for the non-emergency service, and b) the Emergency Service fallback to EPS procedure.

The sending in this Action 602 may be implemented, for example, via the first link 161.

The methods just described as being implemented by the first node 111, the second node 112 and the third node 113 will now be described in further detail with specific non-limiting examples in the next two figures, wherein the first node 111 is an AMF in the first communications network 101, the second node is an NG-RAN node in the first communications network 101, and the third node 113 is a PGW/SMF/UPF node in the second communications network 102.

FIG. 7 is a schematic signalling diagram illustrating a non-limiting example of a call flow for Emergency Service fallback, according to embodiments herein. As indicated in FIG. 7, for embodiments wherein the first node 111 may provide the indication based on at least the service request received from the device 130, the first node 111 may determine the mobility procedure according to Action 402, and then, according to ACTION 403, provide the indication during step 2 in FIG. 7, that is, when providing the N2 request for Emergency call back to the second node 112. The N2 request may be based on the received request from the device 130. The second node 112 receives the indication according to Action 501, and enables then usage of the indicated mobility for the device 130, in accordance with Action 502. All other steps depicted on FIG. 7 may be performed as described in relation to FIG. 1.

Figure 2:
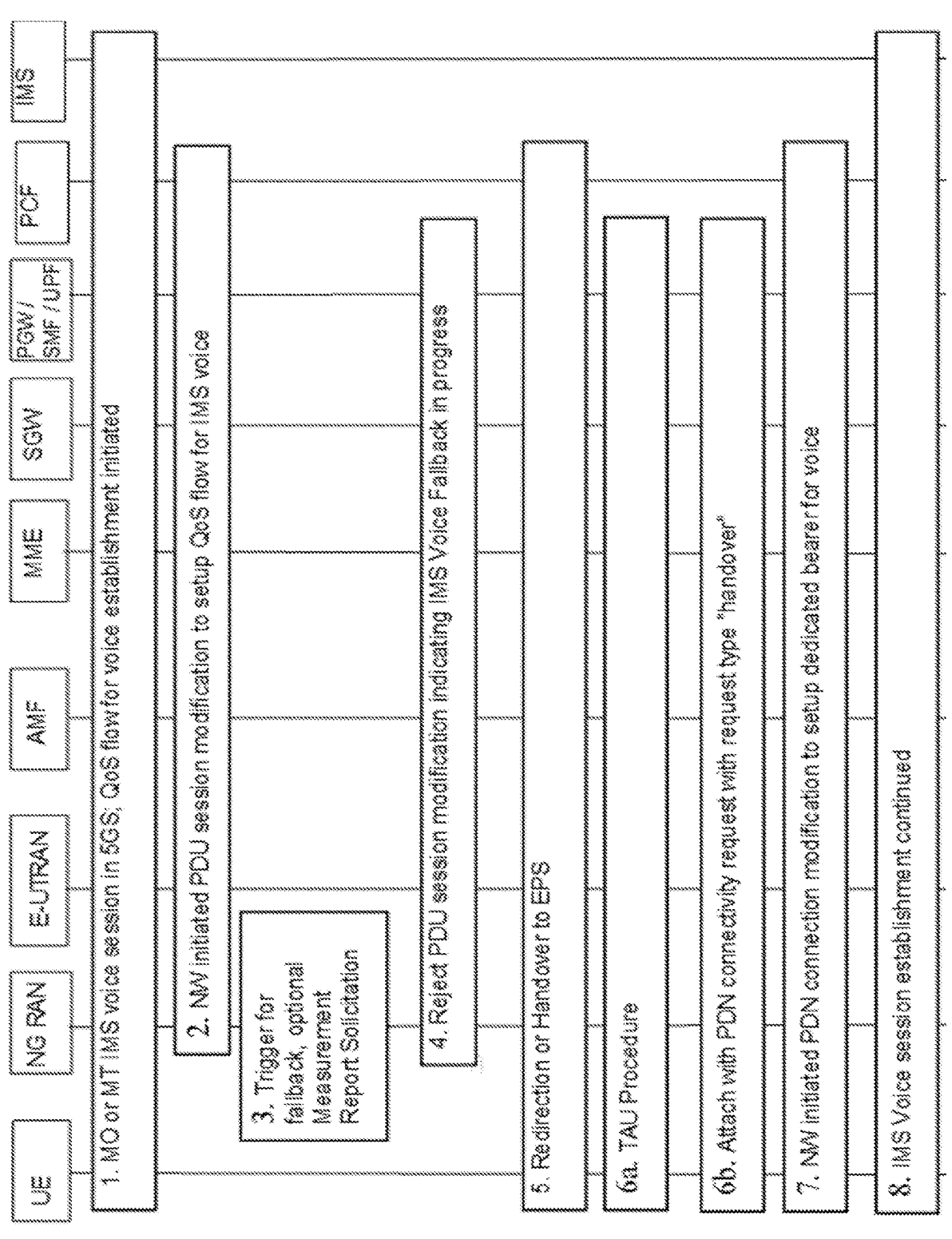
FIG. 2 is a schematic signalling diagram illustrating the call flow for EPS Fallback for IMS voice, according to existing methods.

FIG. 8 is another signalling diagram depicting another non-limiting example of embodiments herein for an when EPS Fallback for non-emergency call is used, according to embodiments herein. As indicated in FIG. 8, for embodiments wherein the first node 111 may provide the indication based on the second performance, the first node 111 may provide the indication, according to Action 403, during QoS resource reservation, in depicted step 2. The second node 112 receives the indication according to Action 501, and enables then usage of the indicated mobility for the device 130, in accordance with Action 502. In other examples, for embodiments wherein the first node 111 may provide the indication based on the second performance, the first node 111 may provide the indication, according to Action 403, during IMS PDU session setup. IMS PDU session setup is taking place before step 1, as depicted. All other steps depicted on FIG. 8 may be performed as described in relation to FIG. 2.

One advantage of embodiments herein is to enable that the first node 111, an AMF, is able to provide preferences for mobility procedures to the second node 112, an NG-RAN, taking into consideration the roaming partners. This may in turn enable that roaming, e.g., 5GC roaming, may be deployed without risk for emergency calls and voice call failures due to mismatching capabilities between the first communications network 101, e.g., a VPLMN and the second communications network 102, e.g., an HPLMN.

Figure 9:
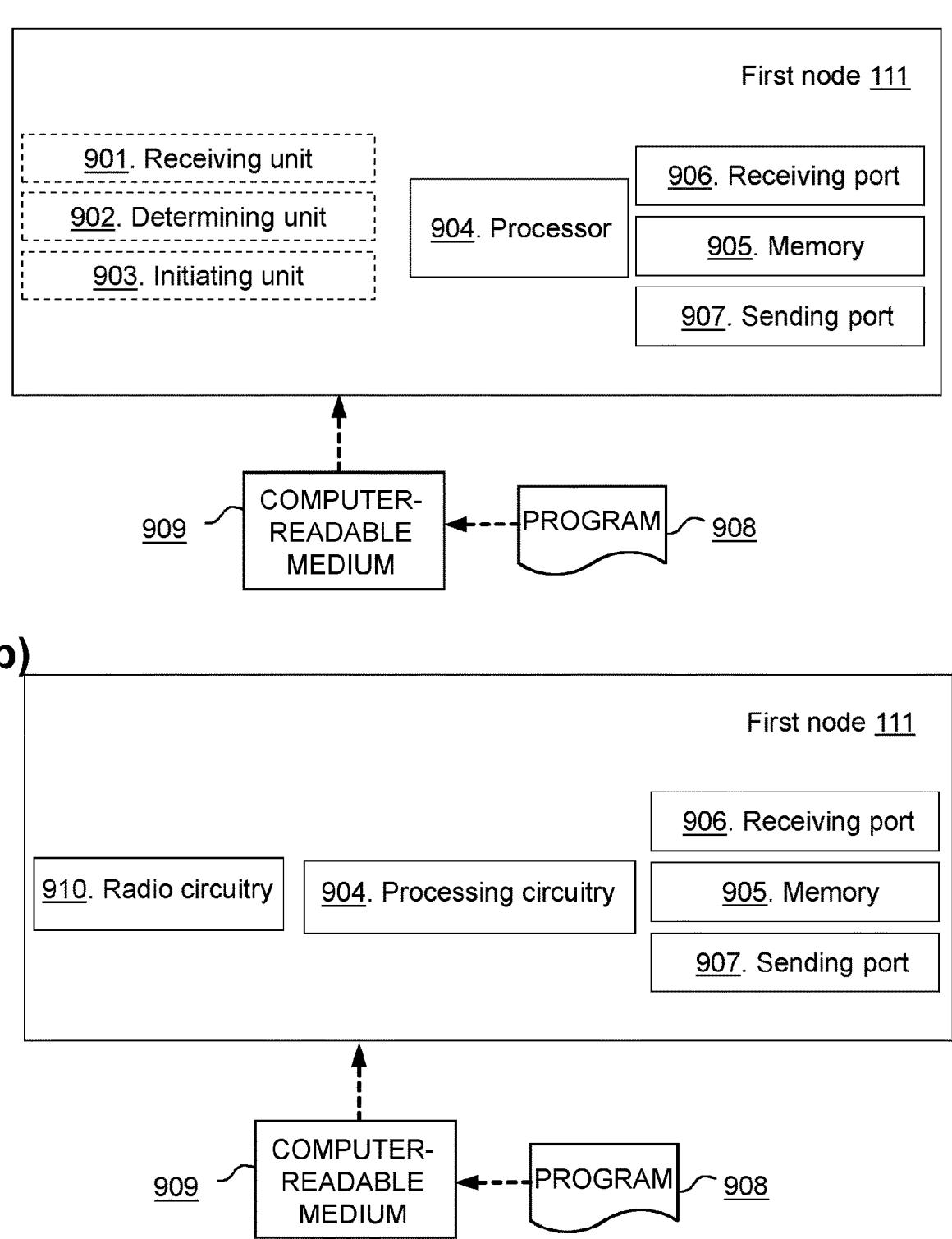
FIG. 9 is a schematic block diagram illustrating two non-limiting examples, a) and b), of a first node, according to embodiments herein.

FIG. 9 depicts two different examples in panels a) and b), respectively, of the arrangement that the first node 111 may comprise to perform the method actions described above in relation to FIG. 4, FIG. 7 and FIG. 8. In some embodiments, the first node 111 may comprise the following arrangement depicted in FIG. 9a. The first node 111 may be understood to be for handling roaming information. The first node 111 is configured to operate in the first communications network 101.

Several embodiments are comprised herein. Components from one embodiment may be tacitly assumed to be present in another embodiment and it will be obvious to a person skilled in the art how those components may be used in the other exemplary embodiments. In FIG. 9, optional boxes are indicated by dashed lines. The detailed description of some of the following corresponds to the same references provided above, in relation to the actions described for the first node 111, and will thus not be repeated here. For example, the first node 111 may be configured to manage an AMF and the second node 112 may be configured to manage an NG-RAN.

The first node 111 is configured to, e.g. by means of a determining unit 901 within the first node 111 configured to, determine the mobility procedure to be used for the device 130 from the second communications network 102 while roaming into the first communications network 101. The mobility procedure is configured to be related to at least one of: a) the EPS fallback procedure for a non-emergency service, and b) the Emergency Service fallback to EPS procedure. To determine the mobility procedure may be configured to be based on the preference of the second communications network 102.

The first node 111 is also configured to, e.g. by means of an initiating unit 902 within the first node 111 configured to, initiate providing the indication of the mobility procedure configured to be determined, to the second node 112 configured to operate in the first communications network 101.

The mobility procedure may be configured to be one of: the redirect method and the inter system handover method In some embodiments, the first node 111 may be configured to, e.g. by means of a receiving unit 903 within the first node 111 configured to, receive the first indication from the third node 113 configured to operate in the second communications network 102. The first indication may be configured to indicate the preference of the second communications network 102. To determine the mobility procedure may be further configured to be based on the first indication configured to be received.

In some embodiments, the third node 113 may be configured to manage one of the UDM, and the SMF.

To determine the mobility procedure may be further configured to be based on at least one of: a) the roaming agreement between the first communications network 101 and the second communications network 102, and b) the roaming status of the device 130.

In some embodiments, the first node 111 may be configured to provide the indication based on at least one of: a) the service request configured to be received from the device 130, wherein the mobility procedure is configured to be related to the Emergency Service fallback to EPS procedure, b) the first performance of at least one of a PDU session setup and PDU session modification for voice, wherein the mobility procedure is configured to be related to the Emergency Service fallback to EPS procedure using a QoS, and c) the second performance of at least one of the PDU session setup and PDU session modification for voice, wherein the mobility procedure is configured to be related to the fallback to EPS procedure for non-emergency service.

In some of the embodiments wherein the first node 111 may be configured to provide the indication based on at least one of: a) the service request configured to be received from the device 130, and b) the first performance, the first node 111 may be further configured to provide the indication based on at least one of: a) the interaction of the device 130 with the first communications network 101 for establishment of the PDU session for IMS services, and b) the registration of the device 130 with the first node 111.

In some of the embodiments wherein the first node 111 may be configured to provide the indication based on at least the service request configured to be received from the device 130, the first node 111 may be further configured to provide the indication when providing the N2 request for Emergency call back to the second node 112. The N2 request may be configured to be based on the request configured to be received from the device 130.

In some of the embodiments wherein the first node 111 may be configured to provide the indication based on the second performance, the first node 111 may be further configured to provide the indication based on at least one of: a) the PDU session modification to setup a QoS flow for IMS voice, and b) the IMS PDU session setup.

The embodiments herein may be implemented through one or more processors, such as a processor 904 in the first node 111 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 905 comprising one or more memory units. The memory 905 is arranged to be used to store obtained information, store data, configurations, schedulings, and applications etc. to perform the methods herein when being executed in the first node 111.

In some embodiments, the first node 111 may receive information from, e.g., the second node 112, the third node 113 and/or the device 130, through a receiving port 906. In some examples, the receiving port 906 may be, for example, connected to one or more antennas in first node 111. In other embodiments, the first node 111 may receive information from another structure in the system of communications networks through the receiving port 906. Since the receiving port 906 may be in communication with the processor 904, the receiving port 906 may then send the received information to the processor 904. The receiving port 906 may also be configured to receive other information.

The processor 904 in the first node 111 may be further configured to transmit or send information to e.g., the second node 112, the third node 113, the device 130 and/or another structure in the system of communications networks, through a sending port 907, which may be in communication with the processor 904, and the memory 905.

Those skilled in the art will also appreciate that the determining unit 901, the initiating unit 902, and the receiving unit 903, described above may refer to a combination of analog and digital circuits, and/or one or more processors configured with software and/or firmware, e.g., stored in memory, that, when executed by the one or more processors such as the processor 904, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the determining unit 901, the initiating unit 902, and the receiving unit 903, described above may be the processor 904 of the first node 111, or an application running on such processor.

Thus, the methods according to the embodiments described herein for the first node 111 may be respectively implemented by means of a computer program 908 product, comprising instructions, i.e., software code portions, which, when executed on at least one processor 904, cause the at least one processor 904 to carry out the actions described herein, as performed by the first node 111. The computer program 908 product may be stored on a computer-readable storage medium 909. The computer-readable storage medium 909, having stored thereon the computer program 908, may comprise instructions which, when executed on at least one processor 904, cause the at least one processor 904 to carry out the actions described herein, as performed by the first node 111. In some embodiments, the computer-readable storage medium 909 may be a non-transitory computer-readable storage medium, such as a CD ROM disc, a memory stick, or stored in the cloud space. In other embodiments, the computer program 908 product may be stored on a carrier containing the computer program, wherein the carrier is one of an electronic signal, optical signal, radio signal, or the computer-readable storage medium 909, as described above.

The first node 111 may comprise an interface unit to facilitate communications between the first node 111 and other nodes or devices, e.g., the second node 112, the third node 113, the device 130 and/or another structure in the system of communications networks. In some particular examples, the interface may, for example, include a transceiver configured to transmit and receive radio signals over an air interface in accordance with a suitable standard.

In other embodiments, the first node 111 may comprise the following arrangement depicted in FIG. 9*b*. The first node 111 may comprise a processing circuitry 904, e.g., one or more processors such as the processor 904, in the first node 111 and the memory 905. The first node 111 may also comprise a radio circuitry 910, which may comprise e.g., the receiving port 906 and the sending port 907. The processing circuitry 904 may be configured to, or operable to, perform the method actions according to FIG. 4, FIG. 7 and/or FIG. 8, in a similar manner as that described in relation to FIG. 9*a*. The radio circuitry 910 may be configured to set up and maintain at least a wireless connection with the second node 112, the third node 113, the device 130 and/or another structure in the system of communications networks. Circuitry may be understood herein as a hardware component.

Hence, embodiments herein also relate to the first node 111 operative to handle roaming information, the first node 111 being operative to operate in the first communications network 101. The first node 111 may comprise the processing circuitry 904 and the memory 905, said memory 905 containing instructions executable by said processing circuitry 904, whereby the first node 111 is further operative to perform the actions described herein in relation to the first node 111, e.g., in FIG. 4, FIG. 7 and/or FIG. 8.

Figure 10:
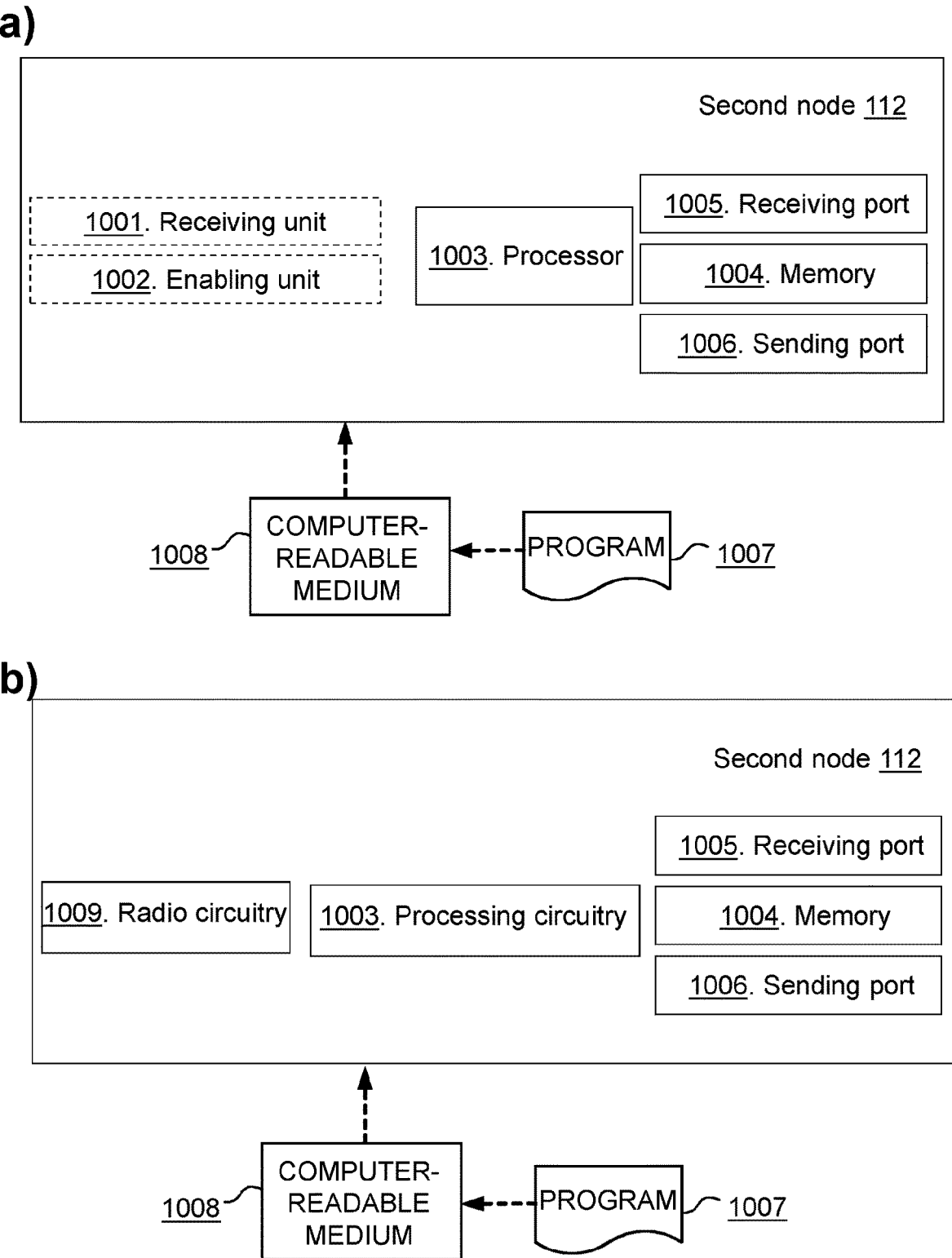
FIG. 10 is a schematic block diagram illustrating two non-limiting examples, a) and b), of a second node, according to embodiments herein.

FIG. 10 depicts two different examples in panels a) and b), respectively, of the arrangement that the second node 112 may comprise to perform the method actions described above in relation to FIG. 5, FIG. 7 and/or FIG. 8. In some embodiments, the second node 112 may comprise the following arrangement depicted in FIG. 10a. The second node 112 may be understood to be for handling roaming information. The second node 112 is configured to operate in the first communications network 101.

Several embodiments are comprised herein. Components from one embodiment may be tacitly assumed to be present in another embodiment and it will be obvious to a person skilled in the art how those components may be used in the other exemplary embodiments. In FIG. 10, optional boxes are indicated by dashed lines. The detailed description of some of the following corresponds to the same references provided above, in relation to the actions described for the second node 112, and will thus not be repeated here. For example, the second node 112 may be configured to manage an NG-RAN node, and the first node 111 may be configured to manage an AMF.

The second node 112 is configured to, e.g. by means of a receiving unit 1001 within the second node 112 configured to, receive the indication from the first node 111 configured to operate in the first communications network 101. The indication is further configured to indicate the mobility procedure to be used for the device 130 from the second communications network 102 while roaming into the first communications network 101. The mobility procedure is configured to be related to at least one of: a) the EPS fallback procedure for a non-emergency service, and b) the Emergency Service fallback to EPS procedure. To determine the mobility procedure is configured to be based on the preference of the second communications network 102.

The second node 112 is also configured to, e.g. by means of an enabling unit 1002 within the second node 112 configured to, enable usage of the mobility procedure configured to be indicated, for the device 130.

The mobility procedure may be configured to be one of: the redirect second node 112 and the inter system handover second node 112.

In some embodiments, the mobility procedure configured to be indicated may be further configured to be based on at least one of: a) the roaming agreement between the first communications network 101 and the second communications network 102, and b) the roaming status of the device 130.

In some embodiments, the second node 112 may be further configured to receive the indication based on at least one of: a) the service request from the device 130, wherein the mobility procedure is configured to be related to the Emergency Service fallback to EPS procedure, b) the first performance of at least one of the PDU session setup and PDU session modification for voice, wherein the mobility procedure is configured to be related to the Emergency Service fallback to EPS procedure using the QoS, and c) the second performance of at least one of a PDU session setup and PDU session modification for voice, wherein the mobility procedure is configured to be related to the fallback to EPS procedure for non-emergency service:

In some of the embodiments wherein the second node 112 is configured to receive the indication based on at least one of: a) the service request from the device 130 and b) the first performance, the second node 112 may be further configured to receive the indication based on at least one of: a) the interaction of the device 130 with the first communications network 101 for establishment of a PDU session for IMS services, and b) the registration of the device 130 with the first node 111.

In some of the embodiments wherein the second node 112 is configured to receive the indication based on at least the service request from the device 130, the second node 112 may be further configured to receive the indication when receiving an N2 request for Emergency call back to the second node 112. The N2 request may be configured to be based on the request from the device 130.

In some of the embodiments wherein the second node 112 is configured to receive the indication based on the second performance, the second node 112 may be further configured to receive the indication based on at least one of: a) the PDU session modification to setup a QoS flow for IMS voice, and b) the IMS PDU session setup.

The embodiments herein may be implemented through one or more processors, such as a processor 1003 in the second node 112 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1004 comprising one or more memory units. The memory 1004 is arranged to be used to store obtained information, store data, configurations, schedulings, and applications etc. to perform the methods herein when being executed in the second node 112.

In some embodiments, the second node 112 may receive information from, e.g., the first node 111, the third node 113 and/or the device 130, through a receiving port 1005. In some examples, the receiving port 1005 may be, for example, connected to one or more antennas in second node 112. In other embodiments, the second node 112 may receive information from another structure in the system of communications networks through the receiving port 1005. Since the receiving port 1005 may be in communication with the processor 1003, the receiving port 1005 may then send the received information to the processor 1003. The receiving port 1005 may also be configured to receive other information.

The processor 1003 in the second node 112 may be further configured to transmit or send information to e.g., the first node 111, the third node 113, the device 130 and/or another structure in the system of communications networks, through a sending port 1006, which may be in communication with the processor 1003, and the memory 1004.

Those skilled in the art will also appreciate that the receiving unit 1001, and/or the enabling unit 1002, described above may refer to a combination of analog and digital circuits, and/or one or more processors configured with software and/or firmware, e.g., stored in memory, that, when executed by the one or more processors such as the processor 1003, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the receiving unit 1001, and the enabling unit 1002 described above may be the processor 1003 of the second node 112, or an application running on such processor.

Thus, the methods according to the embodiments described herein for the second node 112 may be respectively implemented by means of a computer program 1007 product, comprising instructions, i.e., software code portions, which, when executed on at least one processor 1003, cause the at least one processor 1003 to carry out the actions described herein, as performed by the second node 112. The computer program 1007 product may be stored on a computer-readable storage medium 1008. The computer-readable storage medium 1008, having stored thereon the computer program 1007, may comprise instructions which, when executed on at least one processor 1003, cause the at least one processor 1003 to carry out the actions described herein, as performed by the second node 112. In some embodiments, the computer-readable storage medium 1008 may be a non-transitory computer-readable storage medium, such as a CD ROM disc, a memory stick, or stored in the cloud space. In other embodiments, the computer program 1007 product may be stored on a carrier containing the computer program, wherein the carrier is one of an electronic signal, optical signal, radio signal, or the computer-readable storage medium 1008, as described above.

The second node 112 may comprise an interface unit to facilitate communications between the second node 112 and other nodes or devices, e.g., the first node 111, the third node 113, the device 130 and/or another structure in the system of communications networks. In some particular examples, the interface may, for example, include a transceiver configured to transmit and receive radio signals over an air interface in accordance with a suitable standard.

In other embodiments, the second node 112 may comprise the following arrangement depicted in FIG. 10*b*. The second node 112 may comprise a processing circuitry 1003, e.g., one or more processors such as the processor 1003, in the second node 112 and the memory 1004. The second node 112 may also comprise a radio circuitry 1009, which may comprise e.g., the receiving port 1005 and the sending port 1006. The processing circuitry 1003 may be configured to, or operable to, perform the method actions according to FIG. 5, FIG. 7 and/or FIG. 8, in a similar manner as that described in relation to FIG. 10*a*. The radio circuitry 1009 may be configured to set up and maintain at least a wireless connection with the first node 111, the third node 113, the device 130 and/or another structure in the system of communications networks. Circuitry may be understood herein as a hardware component.

Hence, embodiments herein also relate to the second node 112 operative to handle roaming information, the second node 112 being operative to operate in the first communications network 101. The second node 112 may comprise the processing circuitry 1003 and the memory 1004, said memory 1004 containing instructions executable by said processing circuitry 1003, whereby the second node 112 is further operative to perform the actions described herein in relation to the second node 112, e.g., in FIG. 5, FIG. 7 and/or FIG. 8.

Figure 11:
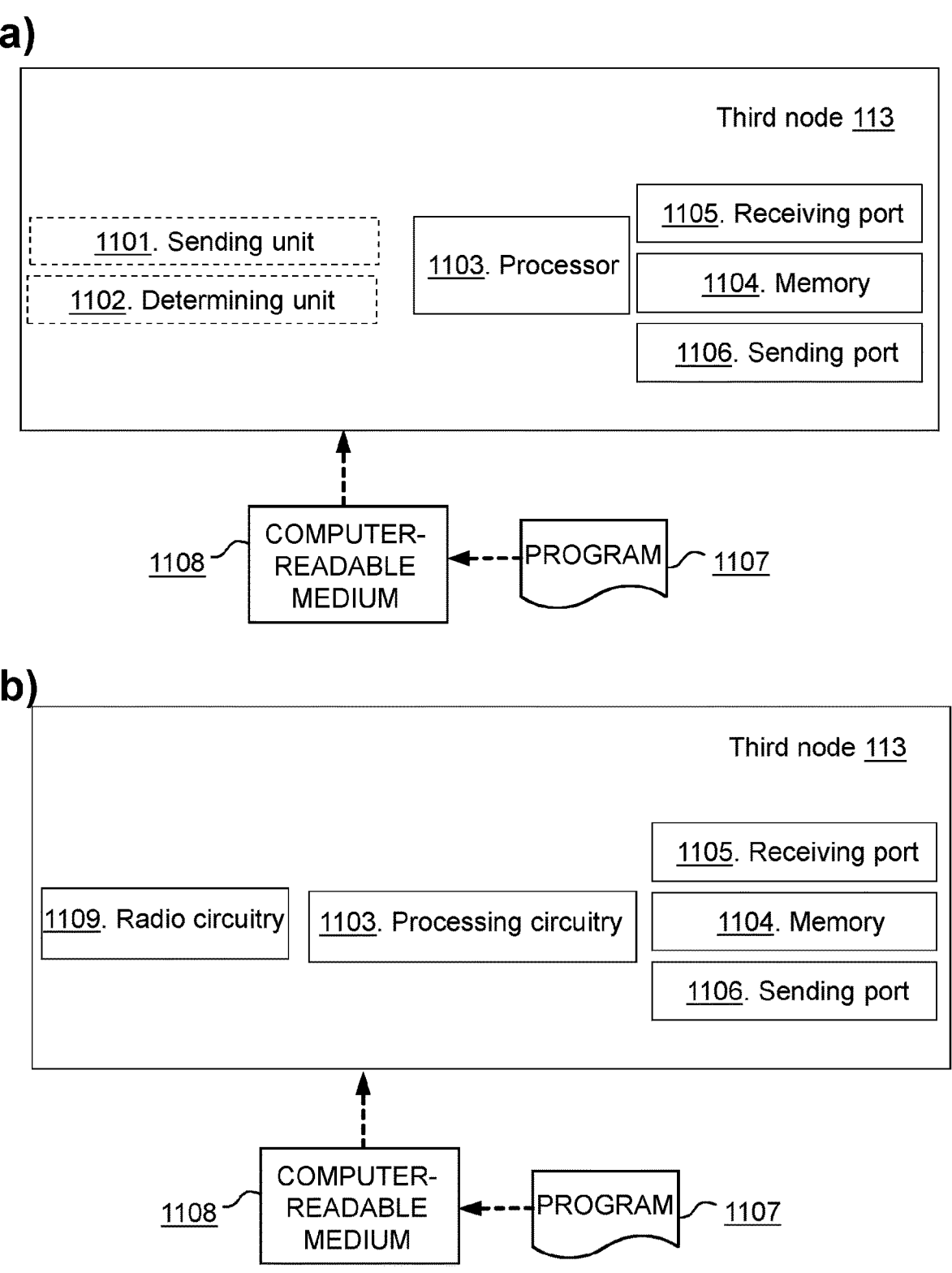
FIG. 11 is a schematic block diagram illustrating two non-limiting examples, a) and b), of a third node, according to embodiments herein.

FIG. 11 depicts two different examples in panels a) and b), respectively, of the arrangement that the third node 113 may comprise to perform the method actions described above in relation to FIG. 6, FIG. 7 and/or FIG. 8. In some embodiments, the third node 113 may comprise the following arrangement depicted in FIG. 11*a*. The third node 113 may be understood to be for handling roaming information. The third node 113 is configured to operate in the second communications network 102.

Several embodiments are comprised herein. Components from one embodiment may be tacitly assumed to be present in another embodiment and it will be obvious to a person skilled in the art how those components may be used in the other exemplary embodiments. In FIG. 11, optional boxes are indicated by dashed lines. The detailed description of some of the following corresponds to the same references provided above, in relation to the actions described for the third node 113, and will thus not be repeated here. For example, the third node 113 may be configured to manage one of a UDM, and an SMF. The first node 111 may be configured to manage an AMF.

The third node 113 is configured to, e.g. by means of a sending unit 1101 within the third node 113 configured to, send the first indication to the first node 111 configured to operate in the first communications network 101. The first indication is configured to indicate the preference of the second communications network 102 for the mobility procedure to be used for the device 130 from the second communications network 102 while roaming into the first communications network 101. The mobility procedure is configured to be related to at least one of: a) the EPS fallback procedure for a non-emergency service, and b) the Emergency Service fallback to EPS procedure.

The mobility procedure may be configured to be one of: the redirect second node 112 and the inter system handover second node 112.

The third node 113 may be further configured to, e.g. by means of a determining unit 1102 within the third node 113 configured to, determine the preference. The first indication may be further configured to indicate the preference configured to be determined.

In some embodiments, to determine the mobility procedure may be configured to be based on at least one of: a) the roaming agreement between the first communications network 101 and the second communications network 102, and b) the roaming status of the device 130.

The embodiments herein may be implemented through one or more processors, such as a processor 1103 in the third node 113 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the third node 113. One such carrier may be in the form of a CD ROM disc. It is however feasible with other data carriers such as a memory stick. The computer program code may furthermore be provided as pure program code on a server and downloaded to the third node 113.

The third node 113 may further comprise a memory 1104 comprising one or more memory units. The memory 1104 is arranged to be used to store obtained information, store data, configurations, schedulings, and applications etc. to perform the methods herein when being executed in the third node 113.

In some embodiments, the third node 113 may receive information from, e.g., the first node 111, the second node 112, and/or the device 130, through a receiving port 1105. In some examples, the receiving port 1105 may be, for example, connected to one or more antennas in third node 113. In other embodiments, the third node 113 may receive information from another structure in the system of communications networks through the receiving port 1105. Since the receiving port 1105 may be in communication with the processor 1103, the receiving port 1105 may then send the received information to the processor 1103. The receiving port 1105 may also be configured to receive other information.

The processor 1103 in the third node 113 may be further configured to transmit or send information to e.g., the first node 111, the second node 112, the device 130 and/or another structure in the system of communications networks, through a sending port 1106, which may be in communication with the processor 1103, and the memory 1104.

Those skilled in the art will also appreciate that the sending unit 1101, and/or the determining unit 1102 described above may refer to a combination of analog and digital circuits, and/or one or more processors configured with software and/or firmware, e.g., stored in memory, that, when executed by the one or more processors such as the processor 1103, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the sending unit 1101 and the determining unit 1102 described above may be the processor 1103 of the third node 113, or an application running on such processor.

Thus, the methods according to the embodiments described herein for the third node 113 may be respectively implemented by means of a computer program 1107 product, comprising instructions, i.e., software code portions, which, when executed on at least one processor 1103, cause the at least one processor 1103 to carry out the actions described herein, as performed by the third node 113. The computer program 1107 product may be stored on a computer-readable storage medium 1108. The computer-readable storage medium 1108, having stored thereon the computer program 1107, may comprise instructions which, when executed on at least one processor 1103, cause the at least one processor 1103 to carry out the actions described herein, as performed by the third node 113. In some embodiments, the computer-readable storage medium 1108 may be a non-transitory computer-readable storage medium, such as a CD ROM disc, a memory stick, or stored in the cloud space. In other embodiments, the computer program 1107 product may be stored on a carrier containing the computer program, wherein the carrier is one of an electronic signal, optical signal, radio signal, or the computer-readable storage medium 1108, as described above.

The third node 113 may comprise an interface unit to facilitate communications between the third node 113 and other nodes or devices, e.g., the first node 111, the second node 112, the device 130 and/or another structure in the system of communications networks. In some particular examples, the interface may, for example, include a transceiver configured to transmit and receive radio signals over an air interface in accordance with a suitable standard.

In other embodiments, the third node 113 may comprise the following arrangement depicted in FIG. 11b. The third node 113 may comprise a processing circuitry 1103, e.g., one or more processors such as the processor 1103, in the third node 113 and the memory 1104. The third node 113 may also comprise a radio circuitry 1109, which may comprise e.g., the receiving port 1105 and the sending port 1106. The processing circuitry 1103 may be configured to, or operable to, perform the method actions according to FIG. 6, FIG. 7 and/or FIG. 8, in a similar manner as that described in relation to FIG. 11a. The radio circuitry 1109 may be configured to set up and maintain at least a wireless connection with the first node 111, the second node 112, the device 130 and/or another structure in the system of communications networks. Circuitry may be understood herein as a hardware component.

Hence, embodiments herein also relate to the third node 113 operative to handle roaming information, the third node 113 being operative to operate in the second communications network 102. The third node 113 may comprise the processing circuitry 1103 and the memory 1104, said memory 1104 containing instructions executable by said processing circuitry 1103, whereby the third node 113 is further operative to perform the actions described herein in relation to the third node 113, e.g., in FIG. 6, FIG. 7 and/or FIG. 8.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

Further Extensions and Variations

Figure 12:
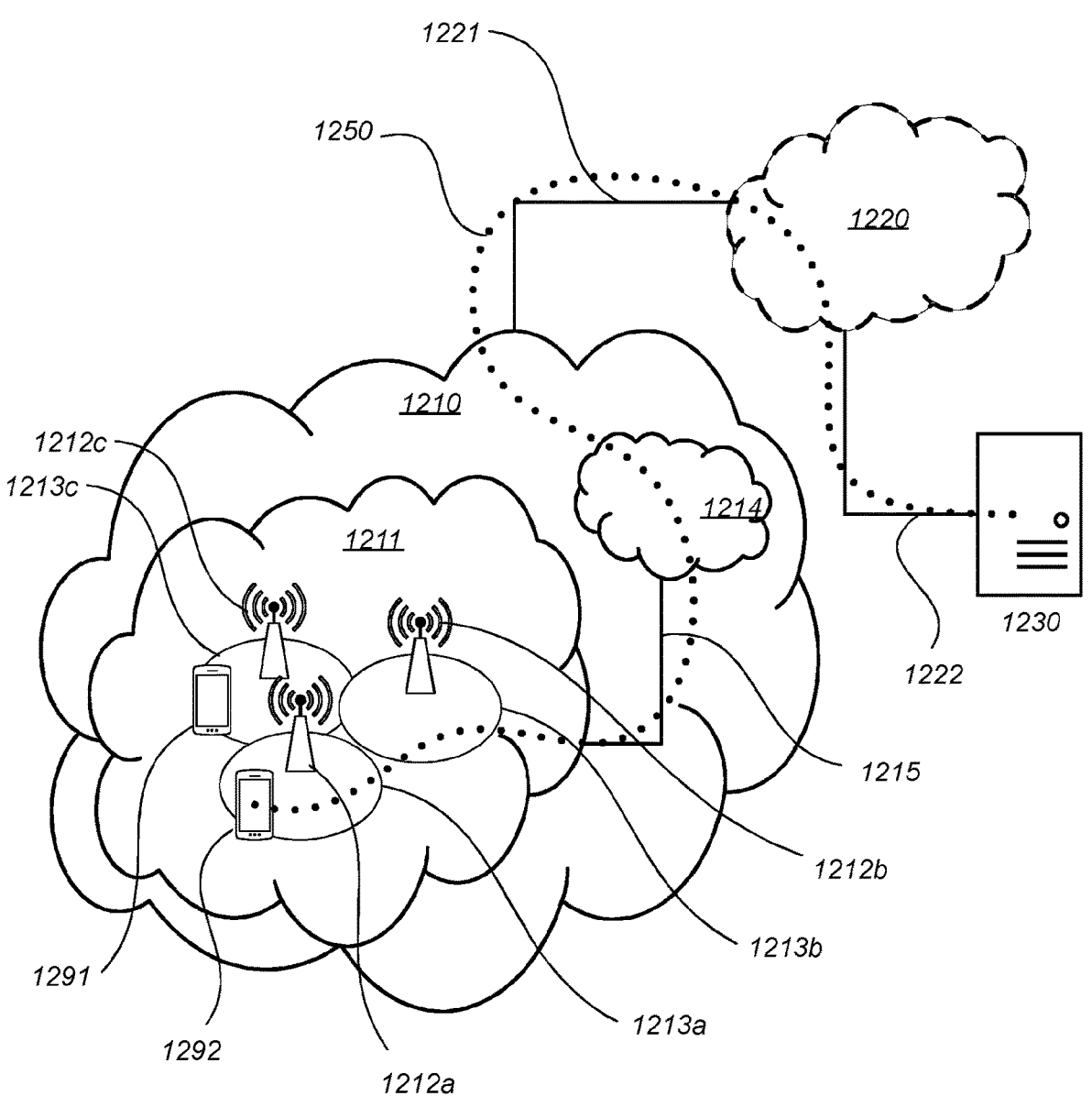
FIG. 12 is a schematic block diagram illustrating a telecommunication network connected via an intermediate network to a host computer, according to embodiments herein.

FIG. 12: Telecommunication Network Connected Via an Intermediate Network to a Host Computer in Accordance With Some Embodiments With reference to FIG. 12, in accordance with an embodiment, a communication system includes telecommunication network 1210 such as the first communications network 101, for example, a 3GPP-type cellular network, which comprises access network 1211, such as a radio access network, and core network 1214. Access network 1211 comprises a plurality of network nodes such as the second node 112. For example, base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. In FIG. 12, a first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212. Any of the UEs 1291, 1292 may be considered to, under certain circumstances, to act as examples of the device 130.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signalling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

In relation to FIGS. 13, 14, 15, 16, and 17, which are described next, it may be understood that a UE is an example of the device 130, and that any description provided for the UE equally applies to the device 130. It may be also understood that the base station is an example of the second node 112, and that any description provided for the base station equally applies to the second node 112.

Figure 13:
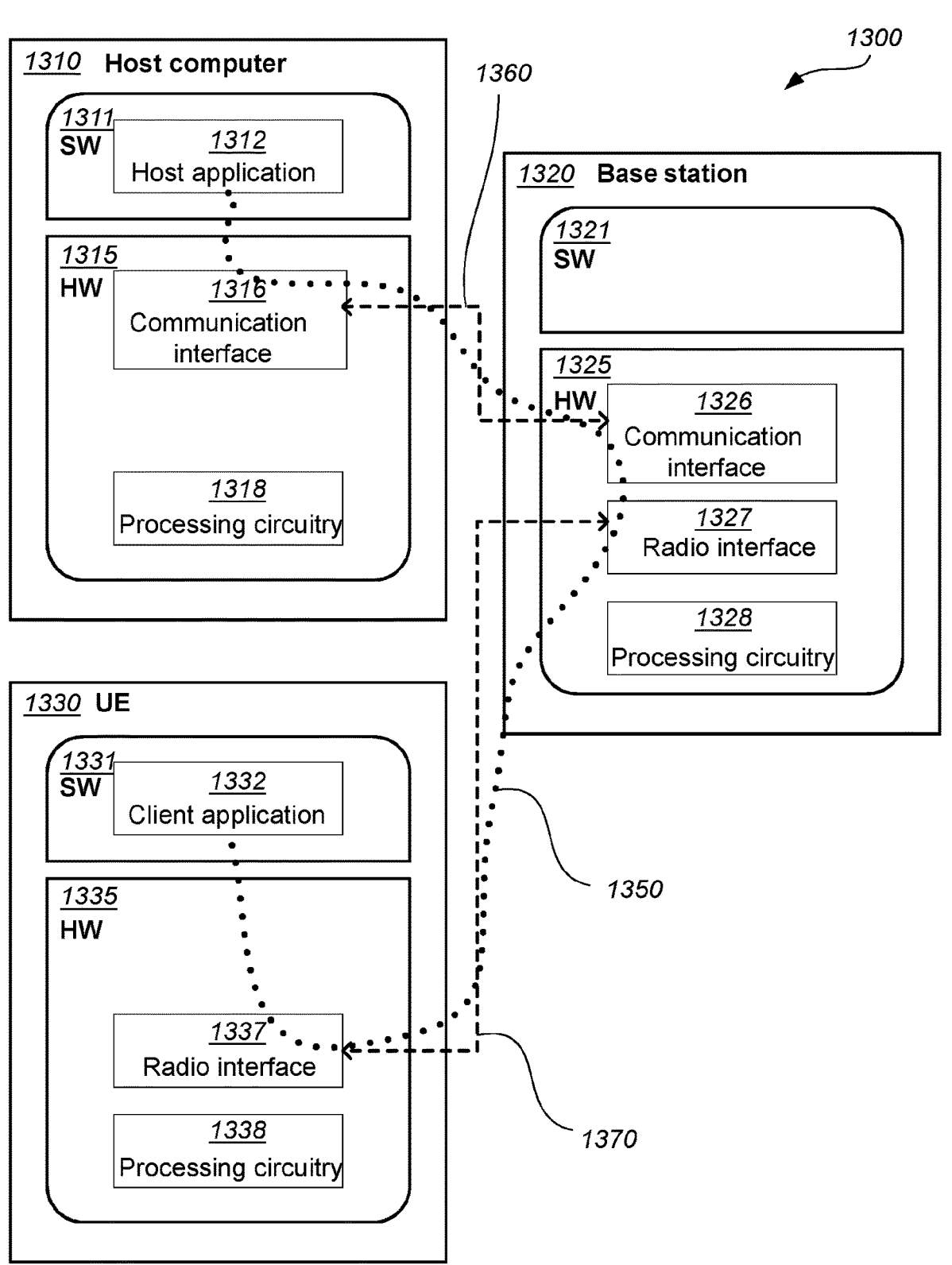
FIG. 13 is a generalized block diagram of a host computer communicating via a base station with a user equipment over a partially wireless connection, according to embodiments herein.

FIG. 13: Host Computer Communicating Via a Base Station With a User Equipment Over a Partially Wireless Connection in Accordance With Some Embodiments Example implementations, in accordance with an embodiment, of the UE, as an example of the device 130, the second node 112, e.g., a base station and host computer discussed in the preceding paragraphs will now be described with reference to FIG. 13. In communication system 1300, such as the first communications network 101, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes the second node 112, exemplified in FIG. 13 as a base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with the device 130, exemplified in FIG. 13 as a UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signalling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

The device 130 embodiments relate to FIG. 3, FIG. 8 and FIGS. 12-17.

The device 130 may also be configured to communicate user data with a host application unit in a host computer 1310, e.g., via another link such as 1350.

In FIG. 8, optional units are indicated with dashed boxes.

The device 130 may comprise an interface unit to facilitate communications between the device 130 and other nodes or devices, e.g., the second node 112, the fourth node 114, the sixth node 116, a wireless device, the host computer 1310, or any of the other nodes. In some particular examples, the interface may, for example, include a transceiver configured to transmit and receive radio signals over an air interface in accordance with a suitable standard.

The device 130 may comprise an arrangement as shown in FIG. 8 or in FIG. 13.

The fourth node 114 embodiments relate to FIG. 4, FIG. 9 and FIGS. 12-17.

The fourth node 114 may also be configured to communicate user data with a host application unit in a host computer 1310, e.g., via another link such as 1350.

In FIG. 9, optional units are indicated with dashed boxes.

The fourth node 114 may comprise an interface unit to facilitate communications between the fourth node 114 and other nodes or devices, e.g., the device 130, the second node 112, the host computer 1310, or any of the other nodes. In some particular examples, the interface may, for example, include a transceiver configured to transmit and receive radio signals over an air interface in accordance with a suitable standard.

The fourth node 114 may comprise an arrangement as shown in FIG. 9 or in FIG. 13.

Figures 14, 15:
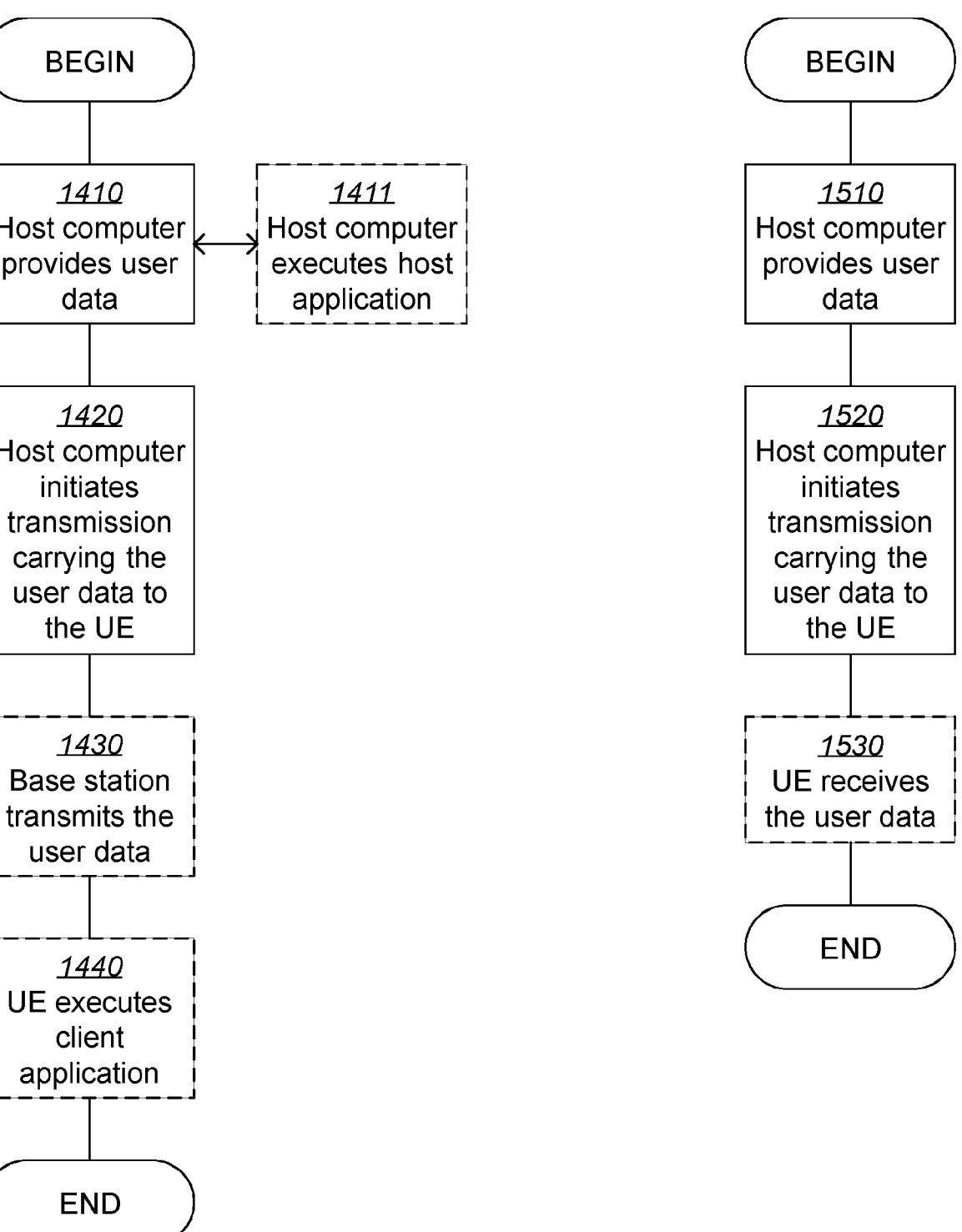
FIG. 14 is a flowchart depicting embodiments of a method in a communications system including a host computer, a base station and a user equipment, according to embodiments herein.
FIG. 15 is a flowchart depicting embodiments of a method in a communications system including a host computer, a base station and a user equipment, according to embodiments herein.

FIG. 14: Methods Implemented in a Communication System Including a Host Computer, a Base Station and a User Equipment in Accordance With Some Embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15: Methods Implemented in a Communication System Including a Host Computer, a Base Station and a User Equipment in Accordance With Some Embodiments FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figures 16, 17:
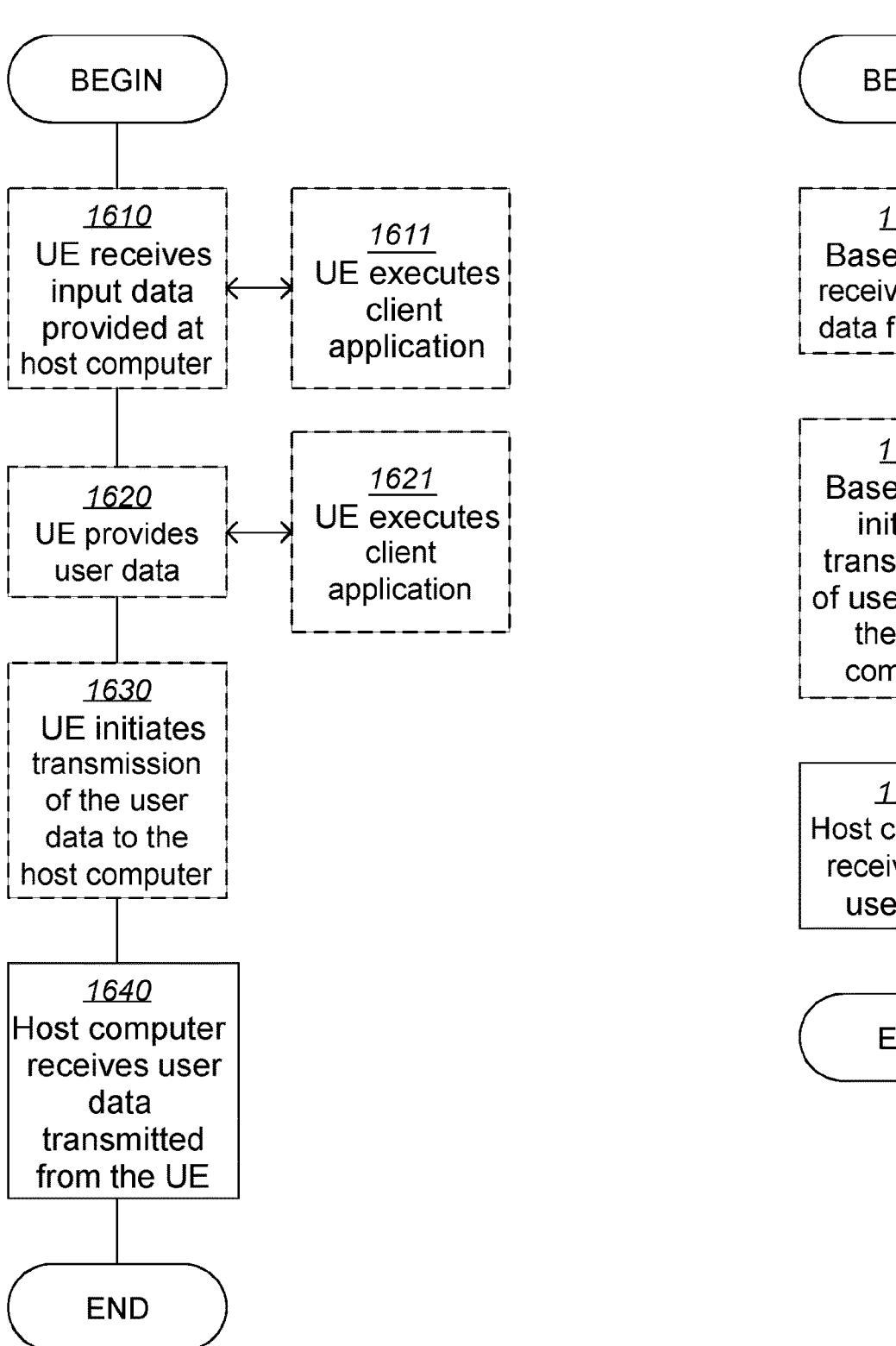
FIG. 16 is a flowchart depicting embodiments of a method in a communications system including a host computer, a base station and a user equipment, according to embodiments herein.
FIG. 17 is a flowchart depicting embodiments of a method in a communications system including a host computer, a base station and a user equipment, according to embodiments herein.

FIG. 16: Methods Implemented in a Communication System Including a Host Computer, a Base Station and a User Equipment in Accordance With Some Embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17: Methods Implemented in a Communication System Including a Host Computer, a Base Station and a User Equipment in Accordance With Some Embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the second node 112.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the second node 112.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by the second node 112.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the second node 112.

16. The method of embodiment 15, further comprising: at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by the device 130.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the device 130.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by the device 130.

35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by the device 130.

36. The method of embodiment 35, further comprising:
   at the UE, receiving the user data from the base station.

41. A user equipment (UE) configured to communicate with a base station, the UE comprising a radio interface and processing circuitry configured to perform one or more of the actions described herein as performed by the device 130.

45. A communication system including a host computer comprising:
   a communication interface configured to receive user data originating from a transmission from a user equipment (UE) to a base station,
   wherein the UE comprises a radio interface and processing circuitry, the UE's processing circuitry configured to: perform one or more of the actions described herein as performed by the device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
   the processing circuitry of the host computer is configured to execute a host application; and
   the UE's processing circuitry is configured to execute a client application associated with the host application, thereby providing the user data.

49. The communication system of embodiment 46 or 47, wherein:
   the processing circuitry of the host computer is configured to execute a host application, thereby providing request data; and
   the UE's processing circuitry is configured to execute a client application associated with the host application, thereby providing the user data in response to the request data.

51. A method implemented in a user equipment (UE), comprising one or more of the actions described herein as performed by the device 130.

52. The method of embodiment 51, further comprising:
   providing user data; and
   forwarding the user data to a host computer via the transmission to the base station.

55. A method implemented in a communication system including a host computer, a base station and a user equipment (UE), the method comprising:
   at the host computer, receiving user data transmitted to the base station from the UE, wherein the UE performs one or more of the actions described herein as performed by the device 130.

56. The method of embodiment 55, further comprising:
   at the UE, providing the user data to the base station.

57. The method of embodiment 56, further comprising:
   at the UE, executing a client application, thereby providing the user data to be transmitted; and
   at the host computer, executing a host application associated with the client application.

58. The method of embodiment 56, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

61. A base station configured to communicate with a user equipment (UE), the base station comprising a radio interface and processing circuitry configured to perform one or more of the actions described herein as performed by the second node 112.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the second node 112.

66. The communication system of embodiment 65, further including the base station.

67. The communication system of embodiment 66, further including the UE, wherein the UE is configured to communicate with the base station.

68. The communication system of embodiment 67, wherein:
   the processing circuitry of the host computer is configured to execute a host application;
   the UE is configured to execute a client application associated with the host application, thereby providing the user data to be received by the host computer.

71. A method implemented in a base station, comprising one or more of the actions described herein as performed by the second node 112.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the device 130.

76. The method of embodiment 75, further comprising:
at the base station, receiving the user data from the UE.

77. The method of embodiment 76, further comprising:
at the base station, initiating a transmission of the received user data to the host computer.

REFERENCES 1. 3GPP TS 22.261 Service requirements for the 5G system; Stage 1 (Release 17)
2. 3GPP TS 23.501 System Architecture for the 5G System (5GS); Stage 2 (Release 16)
3. 3GPP TS 23.502 Technical Specification Group Services and System Aspects; Procedures for the 5G System; Stage 2 (Release 16), v16.3.0

The invention claimed is:

1. A method, performed by a first node, for handling roaming information, the first node operating in a first communications network the method comprising:
receiving a first indication from a third node operating in a second communications network, the first indication indicating a preference of the second communications network for a mobility procedure to be used;
determining, based on the received first indication, a mobility procedure to be used for a device from the second communications network while roaming into the first communications network, the mobility procedure being related to at least one of:
a) an Evolved Packet System, EPS, fallback procedure for a non-emergency service; and
b) an Emergency Service fallback to EPS procedure, determining the mobility procedure being based on the preference of the second communications network; and
initiating providing an indication of the determined mobility procedure to a second node operating in the first communications network.

2. The method according to claim 1, wherein the mobility procedure is one of: a redirect method and an inter system handover method.

3. The method according to claim 1, wherein the third node manages one of a Unified data management, UDM, and a Session Management Function, SMF.

4. The method according to claim 1, wherein determining the mobility procedure is further based on at least one of:
a roaming agreement between the first communications network and the second communications network; and
a roaming status of the device.

5. The method according to claim 1, wherein the first node provides the indication based on at least one of:
a service request received from the device, wherein the mobility procedure is related to the Emergency Service fallback to EPS procedure;
a first performance of at least one of a Protocol Data Unit, PDU, session setup and PDU session modification for voice, wherein the mobility procedure is related to the Emergency Service fallback to EPS procedure using a Quality of Service, QoS; and
a second performance of at least one of a PDU session setup and PDU session modification for voice, wherein the mobility procedure is related to the fallback to EPS procedure for non-emergency service.

6. The method according to claim 5, wherein the first node provides the indication based on at least one of: a) the service request received from the device and b) the first performance, and wherein the first node provides the indication based on at least one of:
an interaction of the device with the first communications network for establishment of a PDU session for IP Multimedia Subsystem, IMS, services; and
a registration of the device with the first node.

7. The method according to claim 5, wherein the first node provides the indication based on at least the service request received from the device, and wherein the first node provides the indication when providing an N2 request for Emergency call back to the second node, the N2 request being based on the received request from the device.

8. The method according to claim 5, wherein the first node provides the indication based on the second performance, and wherein the first node provides the indication based on at least one of:
a PDU session modification to setup a QoS flow for IMS voice; and
an IMS PDU session setup.

9. The method according to claim 1, wherein the first node manages an Access and Mobility Management Function, AMF, and the second node manages a Next Generation Radio Access Network node.

10. A method, performed by a second node, for handling roaming information, the second node operating in a first communications network, the method comprising:
receiving an indication from a first node operating in the first communications network, the indication indicating a mobility procedure to be used for a device from a second communications network while roaming into the first communications network, the mobility procedure being related to at least one of:
a) an Evolved Packet System, EPS, fallback procedure for a non-emergency service; and
b) an Emergency Service fallback to EPS procedure, determining the mobility procedure being based on a preference of the second communications network for a mobility procedure to be used;
the receiving of the indication being based on at least one of:
a service request from the device, wherein the mobility procedure is related to the Emergency Service fallback to EPS procedure;
a first performance of at least one of a Protocol Data Unit, PDU, session setup and PDU session modification for voice, wherein the mobility procedure is related to the Emergency Service fallback to EPS procedure using a Quality of Service, QoS; and
a second performance of at least one of a PDU session setup and PDU session modification for voice, wherein the mobility procedure is related to the fallback to EPS procedure for non-emergency service; and
enabling usage of the indicated mobility procedure for the device.

11. The method according to claim 10, wherein the mobility procedure is one of: a redirect method and an inter system handover method.

12. The method according to claim 10, wherein the indicated mobility procedure is further based on at least one of:

a roaming agreement between the first communications network and the second communications network; and a roaming status of the device.

13. The method according to claim 3, wherein the second node receives the indication based on at least one of: a) the service request from the device and b) the first performance, and wherein the second node receives the indication based on at least one of:

an interaction of the device with the first communications network for establishment of a PDU session for IP Multimedia Subsystem, IMS, services, and a registration of the device with the first node.

14. The method according to claim 10, wherein the second node receives the indication based on at least the service request from the device, and wherein the second node receives the indication when receiving an N2 request for Emergency call back to the second node, the N2 request being based on the request from the device.

15. The method according to claim 10, wherein the second node receives the indication based on the second performance, and wherein the second node receives the indication based on at least one of:

a PDU session modification to setup a QoS flow for IMS voice; and an IMS PDU session setup.

16. The method according to claim 10, wherein the second node manages a Next Generation Radio Access Network node, and the first node manages an Access and Mobility Management Function, AMF.

17. A first node, for handling roaming information, the first node being configured to operate in a first communications network, the first node being further configured to:

receive a first indication from a third node operating in a second communications network, the first indication indicating a preference of the second communications network for a mobility procedure to be used;

determine, based on the received first indication, a mobility procedure to be used for a device from the second communications network while roaming into the first communications network, the mobility procedure being configured to be related to at least one of:

a) an Evolved Packet System, EPS, fallback procedure for a non-emergency service; and b) an Emergency Service fallback to EPS procedure, to determine the mobility procedure being configured to be based on the preference of the second communications network; and initiate providing an indication of the mobility procedure configured to be determined, to a second node configured to operate in the first communications network.

18. A second node, for handling roaming information, the second node configured to operate in a first communications network, the second node being further configured to:

receive an indication from a first node configured to operate in the first communications network, the indication being further configured to indicate a mobility procedure to be used for a device from a second communications network while roaming into the first communications network, the mobility procedure being configured to be related to at least one of:

a) an Evolved Packet System, EPS, fallback procedure for a non-emergency service; and b) an Emergency Service fallback to EPS procedure, to determine the mobility procedure being configured to be based on a preference of the second communications network for a mobility procedure to be used;

the receiving of the indication being based on at least one of:

a service request from the device, wherein the mobility procedure is related to the Emergency Service fallback to EPS procedure;

a first performance of at least one of a Protocol Data Unit, PDU, session setup and PDU session modification for voice, wherein the mobility procedure is related to the Emergency Service fallback to EPS procedure using a Quality of Service, QoS; and a second performance of at least one of a PDU session setup and PDU session modification for voice, wherein the mobility procedure is related to the fallback to EPS procedure for non-emergency service; and enable usage of the mobility procedure configured to be indicated, for the device.

\* \* \* \* \*